United States Patent
Lee et al.

(10) Patent No.: US 10,203,927 B2
(45) Date of Patent: Feb. 12, 2019

(54) DISPLAY APPARATUS AND DISPLAY METHOD

(71) Applicant: SAMSUNG ELECTRONICS CO., LTD., Suwon-si (KR)

(72) Inventors: Seung-hwan Lee, Seoul (KR); Kee-hyun Kim, Yongin-si (KR); Yang sun Ryu, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/942,374

(22) Filed: Nov. 16, 2015

(65) Prior Publication Data

US 2016/0147496 A1    May 26, 2016

(30) Foreign Application Priority Data

Nov. 20, 2014 (KR) .................. 10-2014-0162605

(51) Int. Cl.
*G06F 3/14* (2006.01)
*G06F 3/16* (2006.01)
*H04N 5/45* (2011.01)
*H04N 21/431* (2011.01)
*H04N 21/482* (2011.01)
(Continued)

(52) U.S. Cl.
CPC .......... *G06F 3/1446* (2013.01); *G06F 3/1431* (2013.01); *G06F 3/165* (2013.01); *H04N 5/45* (2013.01); *H04N 21/4312* (2013.01); *H04N 21/482* (2013.01); *G09G 2300/02* (2013.01); *H04N 5/44591* (2013.01); *H04N 21/4438* (2013.01); *H04N 21/4852* (2013.01)

(58) Field of Classification Search
None
See application file for complete search history.

(56) References Cited

U.S. PATENT DOCUMENTS

| 9,055,258 B2 | 6/2015 | Nakaoka |
| 2006/0059525 A1 | 3/2006 | Jerding et al. |

(Continued)

FOREIGN PATENT DOCUMENTS

| CN | 101218598 A | 7/2008 |
| CN | 101959055 A | 1/2011 |

(Continued)

OTHER PUBLICATIONS

Communication dated Jun. 15, 2016, issued by the European Patent Office in counterpart European Application No. 15195573.9.

(Continued)

*Primary Examiner* — Benjamin C Lee
*Assistant Examiner* — Krishna P Neupane
(74) *Attorney, Agent, or Firm* — Sughrue Mion, PLLC

(57) ABSTRACT

A display apparatus and a display method are provided. The display apparatus includes a display configured to display a multi-window screen image comprising windows. The display apparatus further includes an audio output interface, and a controller configured to detect a movement of focus from a window to another window among the windows, analyze a stream of content that is reproduced in the focused other window, in response to the controller detecting the movement of focus, and control the audio output interface to output audio data based on the analysis.

6 Claims, 27 Drawing Sheets

(51) Int. Cl.
  *H04N 21/443* (2011.01)
  *H04N 21/485* (2011.01)
  *H04N 5/445* (2011.01)

(56) References Cited

U.S. PATENT DOCUMENTS

| | | |
|---|---|---|
| 2007/0039032 A1 | 2/2007 | Goldey et al. |
| 2008/0063215 A1 | 3/2008 | Porwal et al. |
| 2008/0111822 A1 | 5/2008 | Horowitz et al. |
| 2009/0037966 A1 | 2/2009 | Rolls et al. |
| 2009/0136060 A1 | 5/2009 | Mishima |
| 2010/0303365 A1* | 12/2010 | Zhang ............... H04H 60/31 382/203 |
| 2011/0078733 A1* | 3/2011 | Lee ............... G06F 3/0346 725/39 |
| 2014/0181885 A1 | 6/2014 | Rusert |
| 2014/0181992 A1 | 6/2014 | Janson et al. |
| 2014/0245148 A1 | 8/2014 | Silva et al. |
| 2014/0333422 A1* | 11/2014 | Phang ............... G08C 17/02 340/12.54 |
| 2014/0365888 A1* | 12/2014 | Curzon ............... G06F 3/0485 715/716 |

FOREIGN PATENT DOCUMENTS

| | | |
|---|---|---|
| CN | 102194435 A | 9/2011 |
| CN | 103493486 A | 1/2014 |
| EP | 1675392 A2 | 6/2006 |
| EP | 2259577 A1 | 12/2010 |
| GB | 2260873 A | 4/1993 |
| KR | 10-0635277 B1 | 10/2006 |
| KR | 10-2009-0015260 A | 2/2009 |
| KR | 10-2009-0033976 A | 4/2009 |
| WO | 2017/182140 A1 | 11/2014 |

OTHER PUBLICATIONS

Communication dated Jul. 7, 2016, issued by the European Patent Office in counterpart European Application No. 15195573.9.
Communication dated Mar. 31, 2016, issued by the International Searching Authority in counterpart International Application No. PCT/KR2015/012130 (PCT/ISA/220, 210, 237).
Communication dated Mar. 14, 2016, issued by the European Patent Office in counterpart European Application No. 15195573.9.
Communication dated Mar. 6, 2018 by the State Intellectual Property Office of P.R. China in counterpart Chinese Patent Application No. 201510809101.8.
Communication dated Aug. 20, 2018, issued by The State Intellectual Property Office of P.R. China in counterpart Chinese Application No. 201510809101.8.

* cited by examiner

DISPLAY APPARATUS AND DISPLAY METHOD

CROSS-REFERENCE TO RELATED PATENT APPLICATION

This application claims priority from Korean Patent Application No. 10-2015-0162605, filed on Nov. 20, 2014, in the Korean Intellectual Property Office, the disclosure of which is incorporated herein by reference in its entirety.

BACKGROUND

1. Field

Apparatuses and methods consistent with exemplary embodiments relate to a display apparatus and a display method, and more particularly, to a display apparatus that provides a multi-window screen image, and a display method performed by the display apparatus.

2. Description of the Related Art

Display apparatuses have a function of displaying an image that can be watched by users. Users can watch a broadcast via a display apparatus. Display apparatuses display, on a display included therein, a broadcast that a user selects from broadcasting signals transmitted by a broadcasting station. Most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, is favorable to error correction, and provides high-resolution and high-definition screen images. In addition, digital broadcasting can provide a bidirectional service, in contrast with analog broadcasting.

Smart televisions (TVs) providing various types of content in addition to a digital broadcasting function have been provided. Smart TVs aim to analyze and provide user needs without manipulations of a user, instead of being manually operated according to a selection by a user. Smart TVs realizing a multi-window screen have also been provided.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus providing a multi-window screen image included of a plurality of windows and controlling sound output, and a display method performed by the display apparatus.

According to an aspect of an exemplary embodiment, there is provided a display apparatus including a display configured to display a multi-window screen image including windows. The display apparatus further includes an audio output interface, and a controller configured to detect a movement of focus from a window to another window among the windows, analyze a stream of content that is reproduced in the focused other window, in response to the controller detecting the movement of focus, and control the audio output interface to output audio data based on the analysis.

The controller may be further configured to control the display to display, on the window or the focused other window, an icon indicating that the audio data of the window or the focused other window is output, based on the analysis.

The controller may be further configured to determine whether the stream of the content includes the audio data.

The controller may be further configured to control the audio output interface to output the audio data of the stream of the content, in response to the controller determining that the stream of the content includes the audio data.

The controller may be further configured to control the display to display, on the focused other window, an icon indicating that the audio data of the focused other window is output, in response to the controller determining that the stream of the content includes the audio data.

The controller may be further configured to control the audio output interface to maintain output of the audio data of the window from which the focus is moved, in response to the controller determining that the stream of the content does not include the audio data.

According to an aspect of another exemplary embodiment, there is provided a display apparatus including a display configured to display a multi-window screen image including windows, and a content item in at least one of the windows. The display apparatus further includes an audio output interface, and a controller configured to detect an input to select the content item, control the display to display content of the selected content item, and control the audio output interface to output audio data based on an analysis of a stream of the content of the selected content item.

The controller may be further configured to control the display to display the content of the selected content item in a window other than a window that is focused among the windows.

According to an aspect of another exemplary embodiment, there is provided a display method including displaying a multi-window screen image including windows. The display method further includes detecting a movement of focus from a window to another window among the windows, analyzing a stream of content that is reproduced in the focused other window, in response to the detecting the movement of focus, and outputting audio data based on the analyzing.

The display method may further include displaying, on the window or the focused other window, an icon indicating that the audio data of the window or the focused other window is output, based on the analyzing.

The analyzing may include determining whether the stream of the content includes the audio data.

The outputting may include outputting the audio data of the stream of the content, in response to the determining that the stream of the content includes the audio data.

The display method may further include displaying, on the focused other window, an icon indicating that the audio data of the focused other window is output, in response to the determining that the stream of the content includes the audio data.

The outputting may include maintaining output of the audio data of the window from which the focus is moved, in response to the determining that the stream of the content does not include the audio data.

According to an aspect of another exemplary embodiment, there is provided a display method including displaying a multi-window screen image including windows, and a content item in at least one of the windows. The display method further includes detecting an input to select the content item, displaying content of the selected content item, and outputting output audio data based on an analysis of a stream of the content of the selected content item.

The displaying the content may include displaying the content of the selected content item in a window other than a window that is focused among the windows.

The display method may further include determining whether the stream of the content includes the audio data.

According to an aspect of another exemplary embodiment, there is provided a display apparatus including a display configured to display windows, an audio output interface, and a controller configured to detect a movement of focus from a window to another window among the windows, determine whether a stream of content that is reproduced in the focused other window includes audio data, control the audio output interface to output audio data of the stream of the content, in response to the controller determining that the stream of the content includes audio data, and control the audio output interface to maintain output of audio data of the window from which the focus is moved, in response to the controller determining that the stream of the content does not include audio data.

The controller may be further configured to control the display to maintain display, on the window, an icon indicating that the audio data of the window is output, in response to the controller determining that the stream of the content does not include audio data.

The controller may be further configured to determine whether an application that is executed in the focused other window has audio data, control the audio output interface to output audio data of the application, in response to the controller determining that the application has audio data, and control the audio output interface to maintain output of the audio data of the window from which the focus is moved, in response to the controller determining that the application does not have audio data.

The controller may be further configured to determine a content item that is reproducible in the focused other window, and control the display to display a visual effect for the content item.

BRIEF DESCRIPTION OF THE DRAWINGS

The above and/or other aspects will be more apparent by describing exemplary embodiments, with reference to the accompanying drawings, in which.

DETAILED DESCRIPTION

Figure 1:
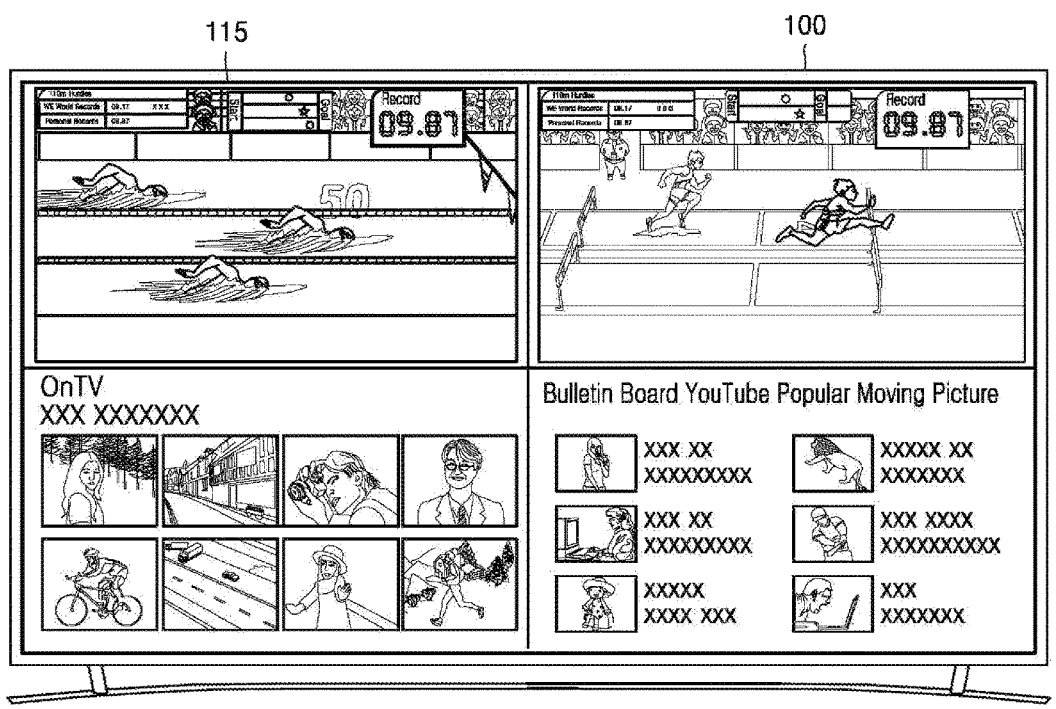
FIG. 1 is a schematic view showing an operation between a display apparatus and a control device, according to an exemplary embodiment.
Figure 1:
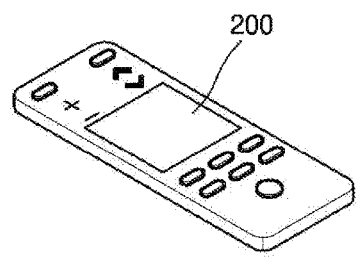

Exemplary embodiments are described in greater detail below with reference to the accompanying drawings an exemplary embodiment In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

While such terms as "first", "second", etc., may be used to describe various components, such components may not be limited to the above terms. The above terms are used only to distinguish one component from another. For example, a first component discussed below could be termed a second component, and similarly, a second component may be termed a first component without departing from the teachings of this disclosure. The term "and/or" includes any and all combinations of one or more of the associated listed items.

Selection of a key arranged on a control device may be terminology that refers to pressing of a key on a control device, touch of a key on a touch pad, or drag of a key on a touch pad.

Content may include video, audio, text, or web documents.

An expression used in the singular encompasses the expression of the plural, unless it has a clearly different meaning in the context.

FIG. 1 is a schematic view showing an operation between a display apparatus 100 and a control device 200, according to an exemplary embodiment.

Referring to FIG. 1, the illustrated display apparatus 100 and the control device 200 are capable of communicating with each other by wire communication or wireless communication.

The control device 200 may control the display apparatus 100 via communication including infrared or Bluetooth. The control device 200 may be manipulated by a user to control a function of the display apparatus 100 by using at least one selected from keys (including buttons) included in the control device 200, a touch pad, a microphone capable of receiving voices of users, and a sensor capable of recognizing motions of the control device 200.

The control device 200 includes a power on/off button for turning on or off the display apparatus 100. The control device 200 may change a channel of the display apparatus 100, adjust the volume of the display apparatus 100, select terrestrial broadcasting/cable broadcasting/satellite broadcasting of the display apparatus 100, or perform setting of the display apparatus 100, according to a user input.

The display apparatus 100 may be implemented by using not only a flat display apparatus but also a curved display apparatus having a curvature or flexible display apparatus capable of adjusting a curvature. An output resolution of the display apparatus 100 may be, for example, a high definition (HD), a full HD, an ultra HD, or a resolution that is clearer than ultra HD. A diagonal length of the screen of the display apparatus 100 may be, for example, 650 mm or less, 660 mm, 800 mm, 1,010 mm, 1,520 mm, 1,890 mm, or no less than 2,000 mm. A horizontal/vertical length of the screen of the display apparatus 100 may be, for example, 643.4 mm×396.5 mm, 934.0 mm×548.6 mm, 1,670.2 mm×962.7 mm, or 2,004.3 mm×1,635.9 mm. Alternatively, a width/length ratio of the screen of the display apparatus 100 may be, for example, 4:3, 16:9, 16:10, 21:9, or 21:10.

The term "user" used herein denotes a person who controls a function or operation of the display apparatus 100 by using the control device 200. Examples of the user may include a viewer, a manager, or an installation engineer.

According to an exemplary embodiment, the display apparatus 100 provides a multi-window screen image including a plurality of windows to a display 115, may detect a focus movement from one window to another window among the plurality of windows, and may control outputting of audio data in response to the detection.

According to an exemplary embodiment, the display apparatus 100 provides a multi-window screen including a plurality of windows to the display 115 and may control outputting of audio data in response to an input to select a content item provided to one of the plurality of windows.

According to an exemplary embodiment, the display apparatus 100 provides a multi-window screen including a plurality of windows to the display 115, may detect a focus movement from one window to another window among the plurality of windows, and may control outputting of audio data according to the type of application that is performed on the focused window or the type of external source in response to the detection.

Figure 2:
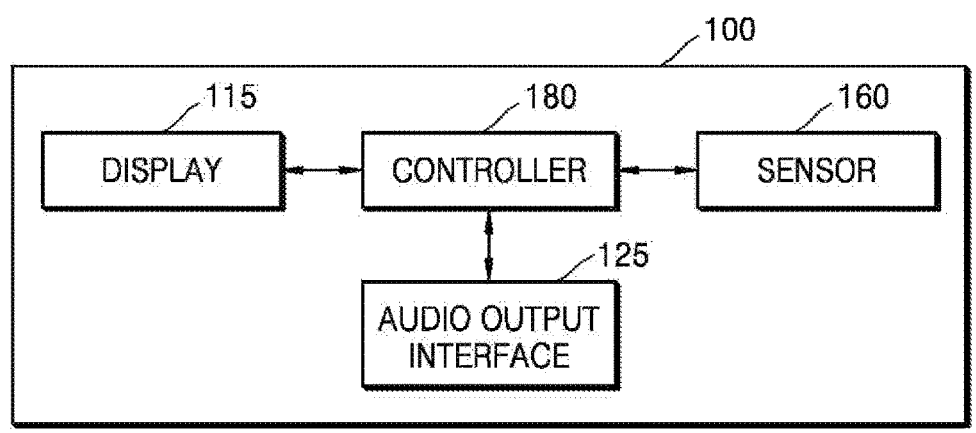
FIG. 2 is a block diagram of a display apparatus, according to an exemplary embodiment.

FIG. 2 is a block diagram of the display apparatus 100, according to an exemplary embodiment.

Referring to FIG. 2, the display apparatus 100 includes the display 115, an audio output interface 125, a controller 180, and a sensor 160.

The display 115 outputs a multi-window screen image including a plurality of windows under a control of the controller 180.

The sensor 160 may receive, from the control device 200, a signal of moving a focus from one window to another window among the plurality of windows of the multi-window screen image and an input signal of selecting a content item provided to a window, under the control of the controller 180.

The controller 180 may control the audio output interface 125 to output audio data according to a result of analyzing a stream of content that is reproduced on a window, in response to the window focus movement signal or the content item selection signal received via the sensor 160.

The audio output interface 125 may output audio data of content that has been reproduced on a window from which the focus was moved, or audio data of content that is reproduced on a window to which the focus was moved, under the control of the controller 180.

The audio output interface 125 may or may not output audio data under the control of the controller 180.

Figure 3:
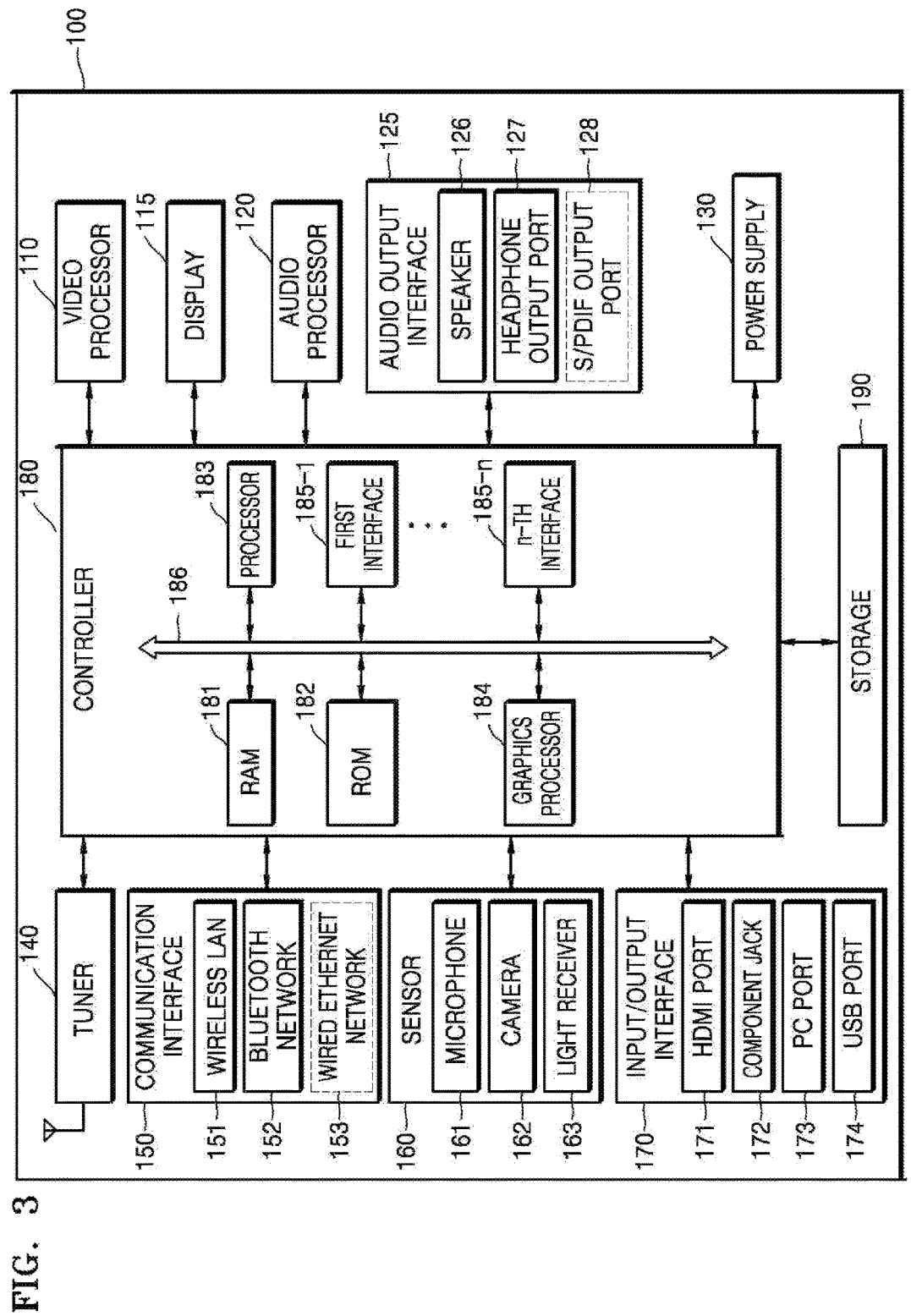
FIG. 3 is a block diagram of a detailed structure of a display apparatus, according to an exemplary embodiment.

FIG. 3 is a block diagram of a detailed structure of the display apparatus 100, according to an exemplary embodiment.

Referring to FIG. 3, the display apparatus 100 includes a video processor 110, the display 115, an audio processor 120, the audio output interface 125, a power supply 130, a tuner 140, a communication interface 150, the sensor 160, an input/output interface 170, the controller 180, and a storage 190.

The video processor 110 processes video data that is received by the display apparatus 100. The video processor 110 may perform various image processing operations, such as decoding, scaling, noise filtering, frame rate transformation, and resolution transformation, on video data.

According to an exemplary embodiment, when the display 115 is provided with a multi-window screen image including a plurality of windows and videos corresponding to pieces of content are respectively output to the plurality of windows, the video processor 110 may process the videos corresponding to the pieces of content by using a plurality of video processing modules.

The display 115 displays video included in a broadcasting signal received via the tuner 140 on the screen thereof, under the control of the controller 180. The display 115 may also display content (for example, a moving picture) that is input via the communication interface 150 or the input/output interface 170. The display 115 may output an image stored in the storage 190 under the control of the controller 180. The display 115 may also display a voice user interface (UI) (e.g., including a voice command word guide) for performing a voice recognition task corresponding to voice recognition, or a motion UI (e.g., including a user motion guide for motion recognition) for performing a motion recognition task corresponding to motion recognition.

The display 115 may provide a multi-window screen image including a plurality of windows under the control of the controller 180.

The display 115 may provide a visual effect to a focused window to highlight the focused window in response to a window focus movement signal received from the control device 200 under the control of the controller 180.

The display 115 may provide a visual effect representing that a content item has been selected in response to a content item selection signal received from the control device 200 under the control of the controller 180.

Figure 8A:
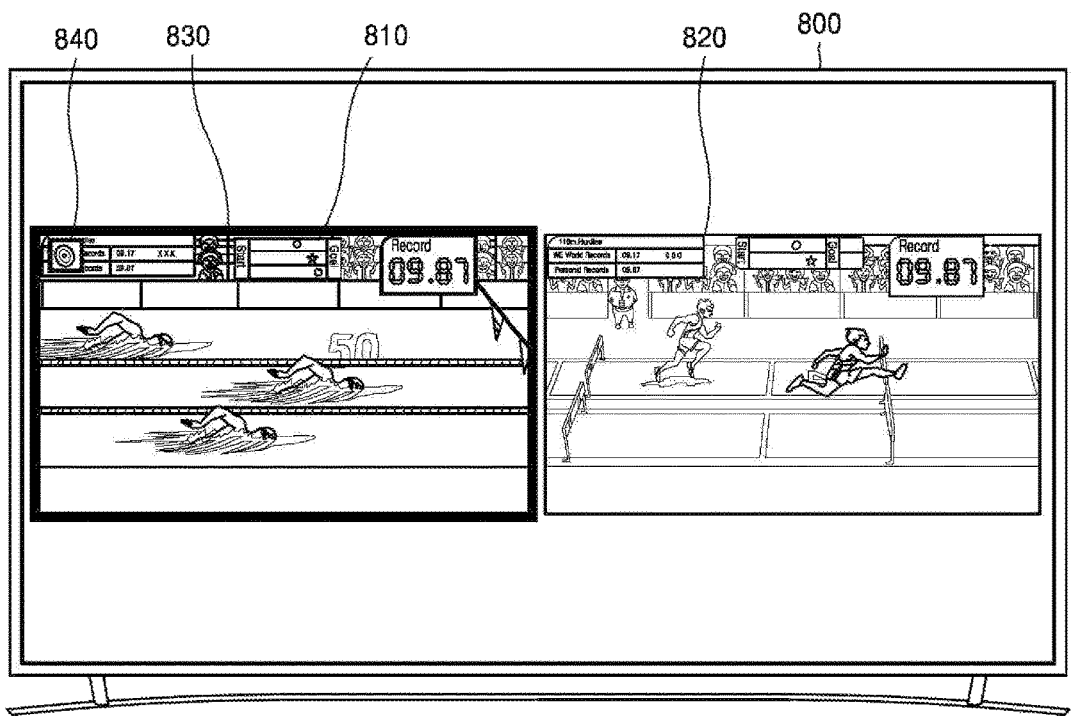
FIGS. 8A, 8B, 8C, and 8D are views showing the method of FIG. 7.
Figure 8B:
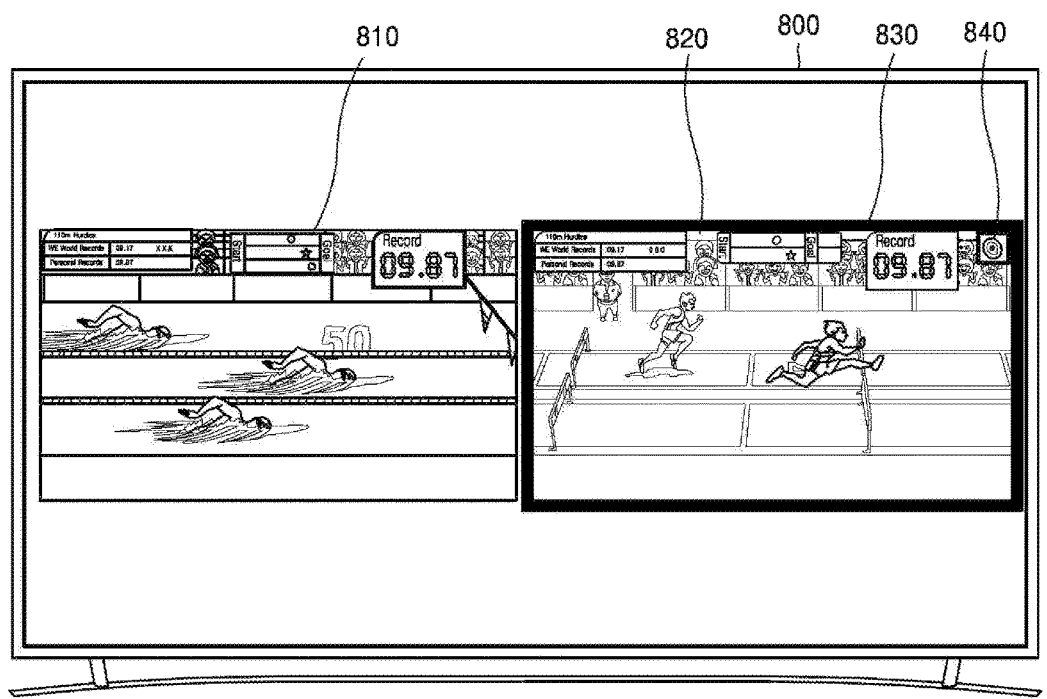
Figure 8C:
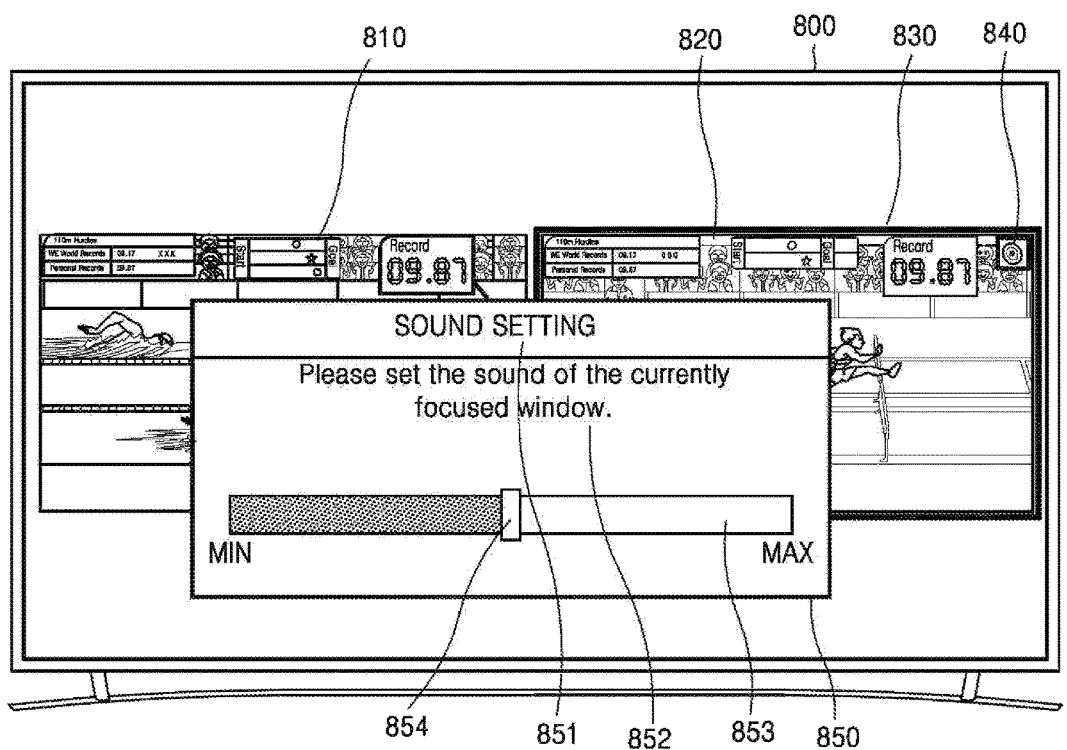

The display 115 may also output a UI capable of receiving a user input for sound setting as shown in FIG. 8C.

The audio processor 120 processes audio data. The audio processor 120 may perform various processing operations, such as decoding, amplification, or noise filtering, on the audio data. The audio processor 120 may include a plurality of audio processing modules to process pieces of audio corresponding to a plurality of pieces of content.

The audio output interface 125 outputs audio included in a broadcasting signal received via the tuner 140, under the control of the controller 180. The audio output interface 125 may also output audio (for example, a voice or a sound) that is input via the communication interface 150 or the input/output interface 170. The audio output interface 125 may also output audio stored in the storage 190 under the control of the controller 180. The audio output interface 125 may include at least one selected from a speaker 126, a headphone output port 127, and a Sony/Philips Digital Interface (S/PDIF) output port 128. The audio output interface 125 may include a combination of the speaker 126, the headphone output port 127, and the S/PDIF output port 128.

The audio output interface 125 may output audio data of content that is reproduced on a focused window among the plurality of windows included in the multi-window screen image, under the control of the controller 180.

The audio output interface 125 may output audio data of content that is reproduced on a window from which focus was moved among the plurality of windows included in the multi-window screen image, even after the window focus movement is detected, under the control of the controller 180.

The audio output interface 125 may or may not output audio data based on the type of application that is executed on the focused window or the type of external source, under the control of the controller 180.

The power supply 130 supplies power that is input from an external power source, to the internal components 110 to 190 of the display apparatus 100, under the control of the controller 180. The power supply 130 may also supply power that is output by one or more batteries located in the display apparatus 100, to the internal components 110 to 190 of the display apparatus 100, under the control of the controller 180.

The tuner 140 may tune and select only a frequency of a channel from many radio wave components that are obtained by, for example, amplifying, mixing, or resonating a wired or wireless broadcasting signal. The broadcasting signal includes audio, video, and additional information (for example, an electronic program guide (EPG)).

The tuner 140 may receive a broadcasting signal in a frequency band corresponding to a channel number according to a user input (for example, a control signal received from the control device 200, for example, a channel number input, a channel up-down, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the storage 190 under the control of the controller 180.

The display apparatus 100 may include a single tuner 140 or a plurality of tuners 140. According to an exemplary embodiment, when a plurality of tuners 140 are included, the plurality of tuners 140 may output a plurality of broadcasting signals to the plurality of windows included in the multi-window screen image provided to the display 115.

The tuner 140 may be all-in-one with the display apparatus 100, or implemented as a separate apparatus (for example, a tuner that is connected to a set-top box and the input/output interface 170) having a tuner that is electrically connected to the display apparatus 100.

The communication interface 150 may connect the display apparatus 100 to an external apparatus (for example, an audio apparatus) under the control of the controller 180. The controller 180 may transmit/receive content to/from the external apparatus connected via the communication interface 150, download an application from the external apparatus, or perform web-browsing. The communication interface 150 may include at least one selected from a wireless local area network (LAN) 151, a Bluetooth network 152, and a wired Ethernet network 153 in correspondence to a performance and a structure of the display apparatus 100. The communication interface 150 may include a combination of the wireless LAN 151, the Bluetooth network 152, and the wired Ethernet network 153. The communication interface 150 may receive a control signal of the control device 200 under the control of the controller 180. The control signal may be implemented as a Bluetooth signal, a radio frequency (RF) signal, or a Wi-Fi type signal.

According to an exemplary embodiment, the communication interface 150 may receive content that is output to at least one of the plurality of windows included in the multi-window screen image via the Internet and provide the received content to the controller 180, the video processor 110, or the display 115.

The communication interface 150 may further include communication (for example, near field communication (NFC), or Bluetooth low energy (BLE), instead of the Bluetooth network 152.

The sensor 160 senses a voice of a user, an image of the user, or an interaction with the user.

A microphone 161 receives a voice of the user. The microphone 161 may transform the received voice into an electrical signal and output the electrical signal to the controller 180. The user voice may include, for example, a voice corresponding to a menu or function of the display apparatus 100. A recognition range of the microphone 161 may be recommended to be within 4 m from the microphone 161 to a location of the user, and may vary in correspondence to the magnitude of the voice of the user and a surrounding environment (for example, a speaker sound or ambient noise).

The microphone 161 may be integrated with or separate from the display apparatus 100. The separate microphone 161 may be electrically connected to the display apparatus 100 via the communication interface 150 or the input/output interface 170.

It will be understood by one of ordinary skill in the art that the microphone 161 may be excluded according to the performance and structure of the display apparatus 100.

A camera 162 receives an image (for example, consecutive frames) corresponding to a motion of the user including a gesture within a recognition range of the camera 162. For example, the recognition range of the camera 162 may be a distance within 0.1 to 5 m from the camera 162 to the user. The motion of the user may include a part of the body of the user or a motion or the like of the part of the user, such as the face, a facial expression, the hand, the fist, and a finder of the user. The camera 162 may convert a received image into an electrical signal under the control of the controller 180 and output the electrical signal to the controller 180.

The controller 180 may select a menu that is displayed on the display apparatus 100 by using a result of the recognition of the received motion, or perform control corresponding to the result of the motion recognition. For example, the control may be channel change, volume adjustment, or indicator movement.

The camera 162 may include a lens and an image sensor. The camera 162 may support optical zoom or digital zoom by using a plurality of lenses and image processing. The recognition range of the camera 162 may be variously set according to the angle of the camera 162 and surrounding environment conditions. When the camera 162 includes a plurality of cameras, a three-dimensional (3D) still image or a 3D motion may be received by the plurality of cameras.

The camera 162 may be integrated with or separate from the display apparatus 100. A separate device including the separate camera 162 may be electrically connected to the display apparatus 100 via the communication interface 150 or the input/output interface 170.

It will be understood by one of ordinary skill in the art that the camera 162 may be excluded according to the performance and structure of the display apparatus 100.

A light receiver 163 receives an optical signal (including a control signal) from the control device 200 via a light window of the bezel of the display 115. The light receiver 163 may receive an optical signal corresponding to a user input (for example, touch, pressing, a touch gesture, a voice, or a motion) from the control device 200. A control signal may be extracted from the received optical signal under the control of the controller 180.

According to an exemplary embodiment, the light receiver 163 may receive an input of moving a focus from one window to another window among the plurality of windows included in the multi-window screen image, via the control device 200, and output the received input to the controller 180.

According to an exemplary embodiment, the light receiver 163 may receive a user input to select a content item output to one of the plurality of windows included in the multi-window screen image, via the control device 200, and output the received user input to the controller 180.

The light receiver 163 may also receive sound settings from the user via the control device 200 and output the received sound settings to the controller 180.

The input/output interface 170 receives video (for example, a moving picture), audio (for example, a voice or music), and additional information (for example, an EPG) from outside the display apparatus 100 under the control of the controller 180. The input/output interface 170 includes a High-Definition Multimedia Interface (HDMI) port 171, a component jack 172, a PC port 173, and a USB port 174. The input/output interface 170 may include a combination of the HDMI port 171, the component jack 172, the PC port 173, and the USB port 174.

According to an exemplary embodiment, the input/output interface 170 may receive content that is output to at least one of the plurality of windows included in the multi-window screen image, and output the received content to the controller 180.

It will be understood by one of ordinary skill in the art that the structure and operation of the input/output interface 170 may be variously implemented according to exemplary embodiments.

The controller 180 controls an overall operation of the display apparatus 100 and signal transfer among the internal components 110 to 190 of the display apparatus 100 and processes data. When there is an input of a user or stored preset conditions are satisfied, the controller 180 may execute an operating system (OS) and various applications that are stored in the storage 190.

The controller 180 includes random access memory (RAM) 181 that stores a signal or data input by an external source of the display apparatus 100 or is used as a memory area for various operations performed by the display apparatus 100, read-only memory (ROM) 182 that stores a control program for controlling the display apparatus 100, and a processor 183.

The processor 183 may include a graphics processor for performing video graphics processing. The processor 183 may be implemented by using a System On Chip (SoC) into which a core and a GPU are incorporated. The processor 183 may include a single core processor, a dual-core processor, a triple-core processor, a quad-core processor, or the like.

The processor 183 may include a plurality of processors. For example, the processor 183 may be implemented by using a main processor and a sub-processor operating in a sleep mode.

A graphics processor 184 generates a screen image including various objects, such as an icon, an image, and a text, by using a calculator and a renderer. The calculator calculates attribute values, such as a coordinate value, a shape, a size, a color, and the like, with which each object is to be displayed according to layouts of the screen image, based on the user interaction sensed by the sensor 160. The renderer generates screen images of various layouts including objects, based on the attribute values calculated by the calculator. The screen images generated by the renderer are displayed on a display area of the display 115.

First through n-th interfaces 185-1 through 185-$n$ are connected to the above-described components of the display apparatus 100. One of the first through n-th interfaces 185-1 through 185-$n$ may be a network interface that is connected to an external apparatus via a network.

The RAM 181, the ROM 182, the processor 183, the graphics processor 184, and the first through n-th interfaces 185-1 through 185-$n$ are connected to each other via an internal bus 186.

The term "a controller of a display apparatus" used in an exemplary embodiment includes the processor 183, the ROM 182, and the RAM 181.

The controller 180 may control at least one selected from the light receiver 163 receiving light output by the control device 200, a panel key located on a lateral or rear surface of the display apparatus 100, the microphone 161 receiving a user's voice, and the camera 162 receiving a user's motion, to receive a user input of moving a focus from one window to another window among the plurality of windows included in the multi-window screen image provided to the display 115 or a user input of selecting a content item provided to a window. The user input may be described in various terms such as a user manipulation, a user command, and an input command.

According to an exemplary embodiment, the controller 180 may detect a movement of a focus from one window to another window among the plurality of windows included in the multi-window screen image, analyze a stream of content that is reproduced on the focused window in response to the detection, and control the audio output interface 125 to output audio data based on the analysis.

According to an exemplary embodiment, the controller 180 may control the display 115 to provide a predetermined icon to the one window or the other window to which focus has been moved, to notify that the audio data is output based on the analysis of the stream of the content that is reproduced on the focused window.

According to an exemplary embodiment, the controller 180 may check whether the stream of the content that is reproduced on the focused window contains audio information.

According to an exemplary embodiment, the controller 180 may control the audio output interface 125 to output audio data corresponding to the audio information, in response to a signal representing that the audio information has been detected from the stream of the content that is reproduced on the focused window.

According to an exemplary embodiment, the controller 180 may control the display 115 to provide a predetermined icon to the focused window to notify that the audio data of the content that is reproduced on the focused window is output.

According to an exemplary embodiment, the controller 180 may control the display 115 to output a UI for setting outputting of the audio data corresponding to the audio information, in response to the signal representing that the audio information has been detected from the stream of the content that is reproduced on the focused window.

According to an exemplary embodiment, the controller 180 may control the audio output interface 125 to maintain outputting audio data used by the window from which focus is moved, in response to a signal indicating that no audio information has been detected from the stream of the content that is reproduced on the focused window.

According to an exemplary embodiment, the controller 180 may control the display 115 to output a predefined icon to the window from which focus is moved, to notify that the audio data used by the window from which focus is moved is output.

According to an exemplary embodiment, the controller 180 may detect an input to select a content item provided to one of the plurality of windows included in the multi-window screen image, output content corresponding to the selected content item in response to the detection, and control the audio output interface 125 to output audio data based on an analysis of a stream of the content corresponding to the selected content item.

According to an exemplary embodiment, the controller 180 may control the display 115 to output the content corresponding to the selected content item via a window other than the currently focused window.

According to an exemplary embodiment, the controller 180 may detect a movement of a focus from one window to another window among the plurality of windows included in the multi-window screen image, analyze a stream of content that is reproduced on the focused window in response to the detection, and control the audio output interface 125 to output audio data based on the analysis.

According to an exemplary embodiment, the controller 180 may detect a movement of a focus from one window to another window among the plurality of windows included in the multi-window screen image, identify the type of application that is executed on the focused window or the type of external source in response to the detection, and control the audio output interface 125 to output audio data based on the identified type of application or external source.

It will be understood by one of ordinary skill in the art pertains that the structure and operation of the controller 180 may be variously implemented according to exemplary embodiments.

The storage 190 may store various data, programs, or applications for driving and controlling the display apparatus 100 under the control of the controller 180. The storage 190 may store input/output signals or data corresponding to driving of the video processor 110, the display 115, the audio processor 120, the audio output interface 125, the power supply 130, the tuner 140, the communication interface 150, the sensor 160, and the input/output interface 170. The storage 190 may store a control program for controlling the display apparatus 100 and the controller 180, an application initially provided by a manufacturer or downloaded from outside the display apparatus 100, a graphical user interface (GUI) associated with the application, objects (for example, an image text, an icon, and a button) for providing the GUI, user information, a document, databases, or related pieces of data.

According to an exemplary embodiment, the term "storage" includes the storage 190, the ROM 182, and/or the RAM 181 of the controller 180, or a memory card (e.g., a micro SD card or a USB memory) mounted in the display apparatus 100. The storage 190 may include a non-volatile memory, a volatile memory, a hard disk drive (HDD), or a solid state drive (SSD).

The storage 190 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB. These modules and DBs of the storage 190 may be implemented as software to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (for example, Bluetooth) connected external apparatus, of the display apparatus 100. The controller 180 may perform these functions by using software stored in the storage 190.

According to an exemplary embodiment, the storage 190 may store sound setting information that is obtained from a user and received via the light receiver 163, the panel key, the microphone 161, or the camera 162.

The storage 190 may store a moving picture or an image corresponding to visual feedback.

The storage 190 may store a sound corresponding to auditory feedback.

The display apparatus 100 having the display 115 may be electrically connected to an external apparatus (for example, a set-top box) having a tuner. For example, the display apparatus 100 may be implemented by using an analog TV, a digital TV, a 3D TV, a smart TV, an LED TV, an OLED TV, a plasma TV, a monitor, or the like, but it will be understood by one of ordinary skill in the art that exemplary embodiments are not limited thereto.

The display apparatus 100 may include a sensor (for example, an illumination sensor or a temperature sensor) for detecting an internal or external state of the display apparatus 100.

According to the performance of the display apparatus 100, at least one component may be added to the components (for example, the components 110 to 190) of the display apparatus 100 of FIG. 3, or at least one of the components (for example, the components 110 to 190) of the display apparatus 100 of FIG. 3 may be deleted. It will also be understood by one of ordinary skill in the art that the locations of the components (for example, the components 110 to 190) of the display apparatus 100 of FIG. 3 may be changed according to the performance or structure of the display apparatus 100.

Figure 4:
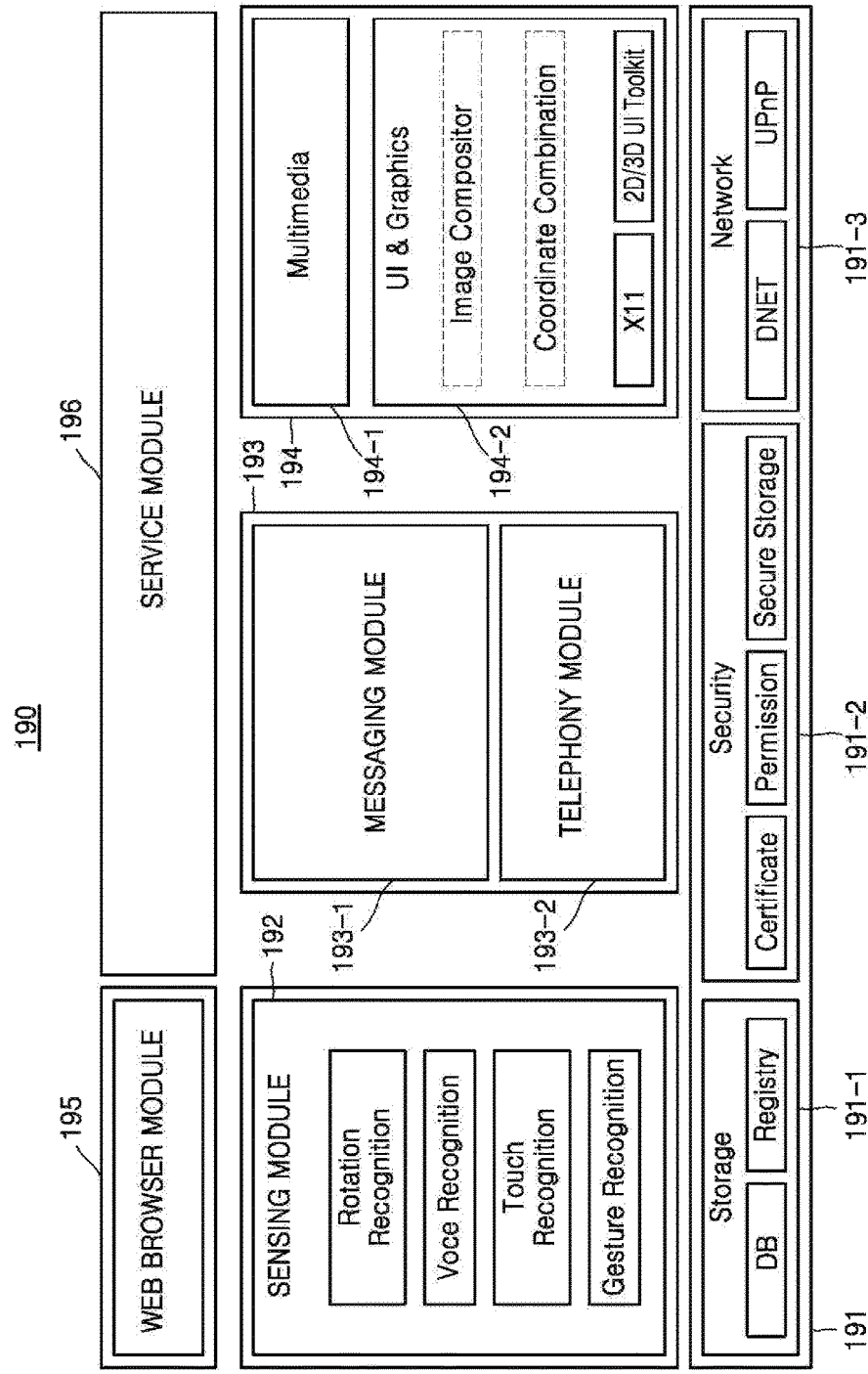
FIG. 4 is a block diagram of a software structure stored in a storage included in a display apparatus.

FIG. 4 is a block diagram of a software structure stored in the storage 190 included in the display apparatus 100.

Referring to FIG. 4, the storage 190 stores software including a base module 191, a sensing module 192, a communication module 193, a presentation module 194, a web browser module 195, and a service module 196.

The base module 191 is a base module which processes a signal that is received from each hardware included in the display apparatus 100 and transmits a processed signal to an upper layer module. The base module 191 includes a storage module 191-1, a security module 191-2, and a network module 191-3. The storage module 191-1 is a program module which manages a DB or a registry. The processor 183 may access the DB included in the storage 190 by using the storage module 191-1 and read various pieces of data from the DB. The security module 191-2 is a program module which supports certification, permission, secure storage, and the like of hardware. The network module 191-3 supports network connection, and includes a DNET module, an UPnP module, or the like.

The sensing module 192 collects information from various sensors and analyzes and manages the collected information. The sensing module 192 may include a head direction recognition module, a face recognition module, a voice recognition module, a motion recognition module, an NFC recognition module, a rotation recognition module, a touch recognition module, and a gesture recognition module, and the like.

The communication module 193 performs communication with an external source. The communication module 193 includes a messaging module 193-1, such as a messenger program, a short message service (SMS) & multimedia message service (MMS) program, or an e-mail program, and a telephony module 193-2 including a call info aggregator program module, a VoIP module, or the like.

The presentation module 194 constructs a display screen image. The presentation module 194 includes a multimedia module 194-1 for reproducing and outputting multimedia content, and a UI rendering module 194-2 rendering a UI and performing graphics processing. The multimedia module 194-1 may include a player module, a camcorder module, a sound processing module, and the like. Accordingly, the multimedia module 194-1 produces and reproduces a screen image and a sound by reproducing various types of multimedia content. The UI rendering module 194-2 may include an image composition module that composes an image, a coordinate combination module which combines coordinates on a screen on which an image is to be displayed, an X11 module which receives various events from hardware, and a 2D/3D UI toolkit which provides a tool for constructing a 2D or 3D UI.

The web browser module 195 accesses a web server by performing web browsing. The web browser module 195 may include various modules, such as a web view module which constructs a web page, a download agent module which performs downloading, a bookmark module, and a Webkit module.

The service module 196 includes various applications for providing various services. In detail, the service module 196 may include various program modules, such as an SNS program, a content reproduction program, a game program, an electronic book program, a calendar program, an alarm management program, and other Widgets.

FIG. 4 illustrates various program modules, but some of the illustrated program modules may be omitted or modified, or other program modules may be added to the illustrated various program modules, according to the type and characteristics of the display apparatus 100. For example, a location-based module for supporting a location-based service by interacting with hardware, such as a global positioning system (GPS) chip, may be further included in the storage 190.

Figure 5A:
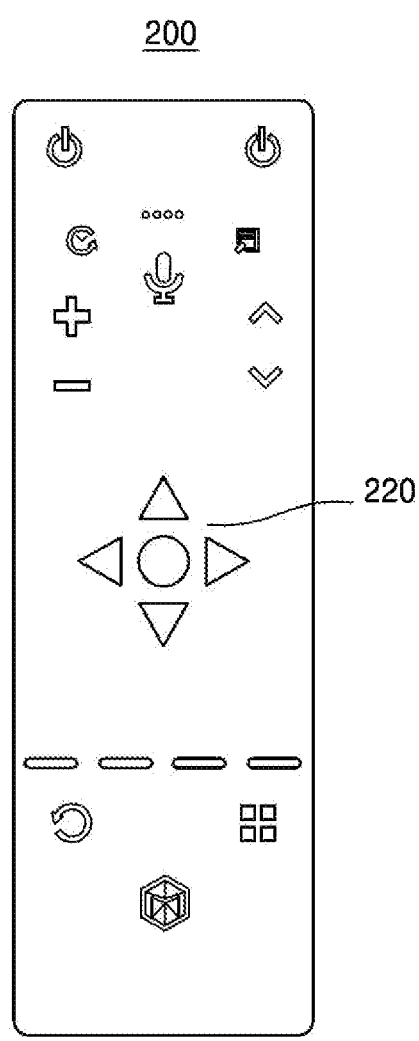
FIGS. 5A, 5B, and 5C are views showing the control device of FIG. 1, according to exemplary embodiments.
Figure 5B:
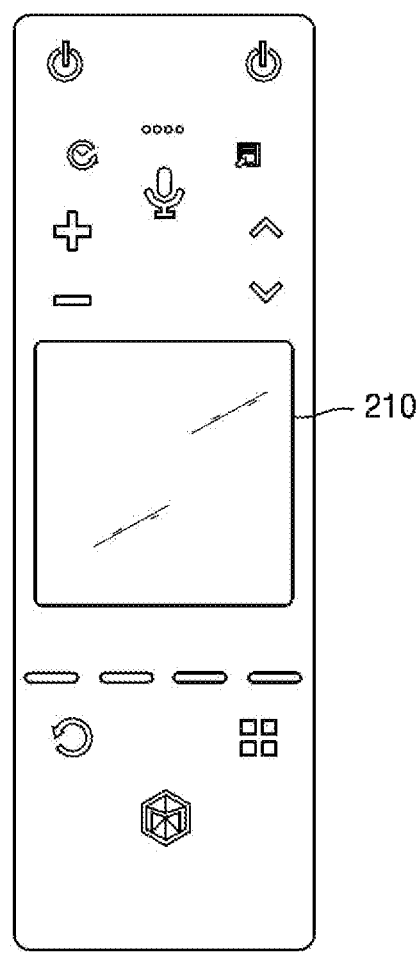
Figure 5C:
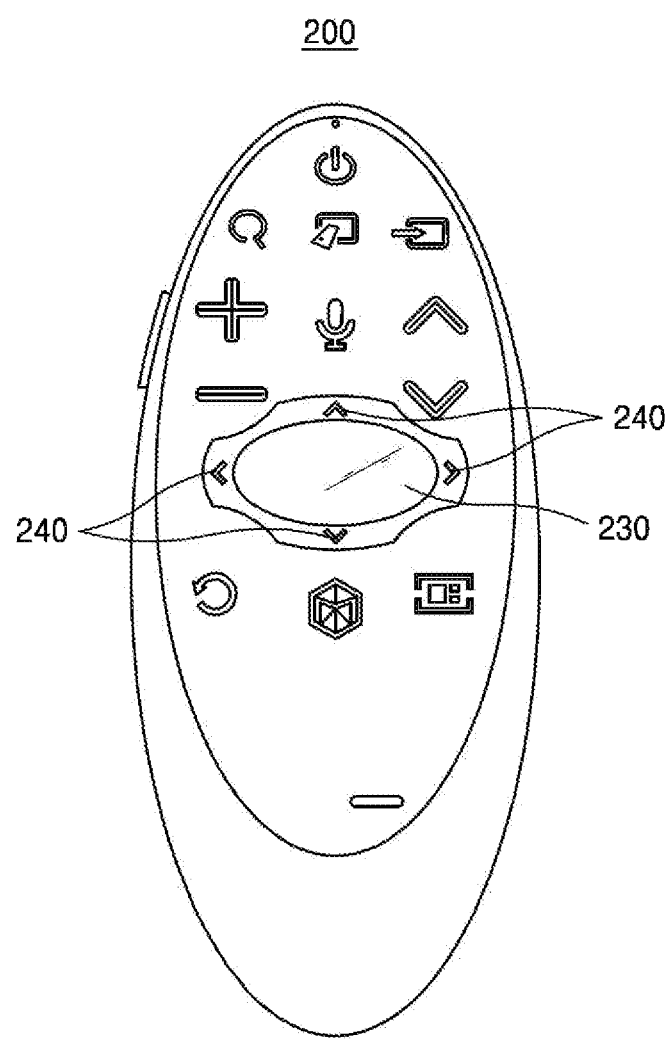

FIGS. 5A, 5B, and 5C are views showing the control device 200 of FIG. 1, according to exemplary embodiments.

Referring to FIG. 5A, an exemplary embodiment of the control device 200 includes four direction buttons or four direction keys 220. The four direction buttons or four direction keys 220 may be used to control a window, an area, an application, or an item displayed on the display 115. In other words, the sensor 160 may sense a user interaction of pressing one of the four direction buttons or four direction keys 220 and thus control the display 115. Four direction buttons or keys may be used to indicate, for example, up, down, left, and right movements. It will be understood by one of ordinary skill in the art that the control device 200 may include two direction keys or two direction buttons instead of four direction buttons or four direction keys.

Referring to FIG. 5B, another exemplary embodiment of the control device 200 includes a touch pad 210 instead of the four direction buttons or four direction keys 220.

Accordingly, the sensor 160 may sense a user interaction of performing dragging, touching, or flipping via the touch pad 210 of the control device 200. The display apparatus 100 may be controlled according to the type of sensed user interaction (for example, a direction in which a drag command is input, or a time when a touch command is input).

Referring to FIG. 5C, another exemplary embodiment of the control device 200 is implemented by using a pointing device including both four direction buttons or keys 240 and a touch pad 230. In other words, when the control device 200 is implemented by using a pointing device, the function of the display apparatus 100 may be controlled according to, for example, the direction or angle in or at which the control device 200 is inclined.

According to an exemplary embodiment, a user may move a focus from one window to another window among a plurality of windows that constitute a multi-window screen image, or select a content item provided to a window, by using direction keys, a touch pad, a pointing function, or the like of the control device 200.

Moreover, according to an exemplary embodiment, the user may perform sound setting of audio data of content that is output, by using the direction keys, the touch pad, or the pointing function of the control device 200.

Figure 6:
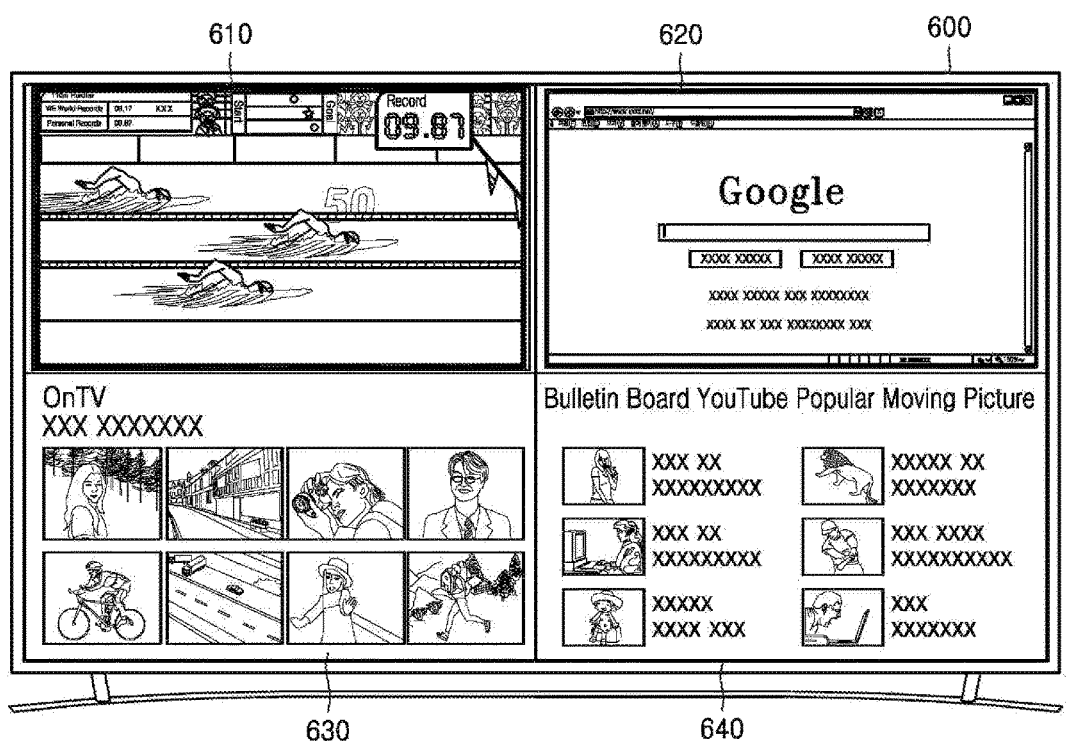
FIG. 6 is a view showing a multi-window screen image including a plurality of windows, according to an exemplary embodiment.

FIG. 6 is a view showing a multi-window screen image 600 including a plurality of windows, according to an exemplary embodiment.

Referring to FIG. 6, the multi-window screen image 600 provided to the display 115 includes four windows, namely, a window 610, a window 620, a window 630, and a window 640. A window used herein refers to each partial screen image when the screen image of the display 115 is divided into a plurality of areas, and may be referred to as various terms such as a screen part and a sub-screen.

Although the multi-window screen image 600 includes four windows in FIG. 6, exemplary embodiments of the multi-window screen 600 are not limited thereto. If a screen image is divided into a plurality of windows, a multi-window screen image may include any number of windows. For example, the display apparatus 200 may include any number of windows, such as two windows, three windows, four windows, or eight windows, in a multi-window screen image.

The display apparatus 100 may use the windows to reproduce different applications or different pieces of content. In other words, the display apparatus 100 may independently use the windows to display a TV broadcasting program received via the tuner 140, output a web browsing screen image by using data received via the communication interface 150, or output data received via the input/output interface 170 or the storage 190.

In the example of FIG. 6, the display apparatus 100 outputs a TV broadcasting program via the window 610, provides an Internet web browsing screen image via the window 620, outputs via the window 630 information about programs that are being currently broadcast, and provides YouTube screen images via the window 640.

A user may move a focus between the four windows, namely, the window 610, the window 620, the window 630, and the window 640, included in the multi-window screen image 600, by using the direction keys, the touch pad, or the pointing function of the control device 200.

Referring to FIG. 6, a colored band surrounds the edge of the window 610 to represent that the window 610 is currently focused. To express a focused window, various visual effects may also be provided to the edge of the focused window.

For example, the user may watch broadcast content being output via the focused window 610 and then select the window 620 by using the control device 200 to perform an Internet search via a web browser screen image. Due to this user selection, the focus may be moved from the window 610 to the window 620, and then a colored band, for example, may surround the edge of the window 620 to represent that the window 620 is a focused window.

When the screen of the display 115 is used to provide a multi-window screen image, a plurality of windows may be provided to the multi-window screen image, and a plurality of different pieces of content including audio/video data may be respectively output to the plurality of windows. Although a plurality of pieces of video data may be output via the plurality of windows because the screen is divided, simultaneously outputting a plurality of pieces of audio data is meaningless in many cases because of the characteristics of audio data. Thus, when a multi-window screen image is realized, audio data may be set such that a sound is output from one of the plurality of windows. Accordingly, when a window via which a sound is output is fixed, content of which sound is output may be controlled to be always output via the fixed window, and thus window control is restricted. Moreover, to change the window via which a sound is output, a user may manually set a window via which a sound is output, thus causing user inconvenience. According to exemplary embodiments, this user inconvenience is addressed to adaptively control sound output according to content selection or focus movement.

Figure 7:
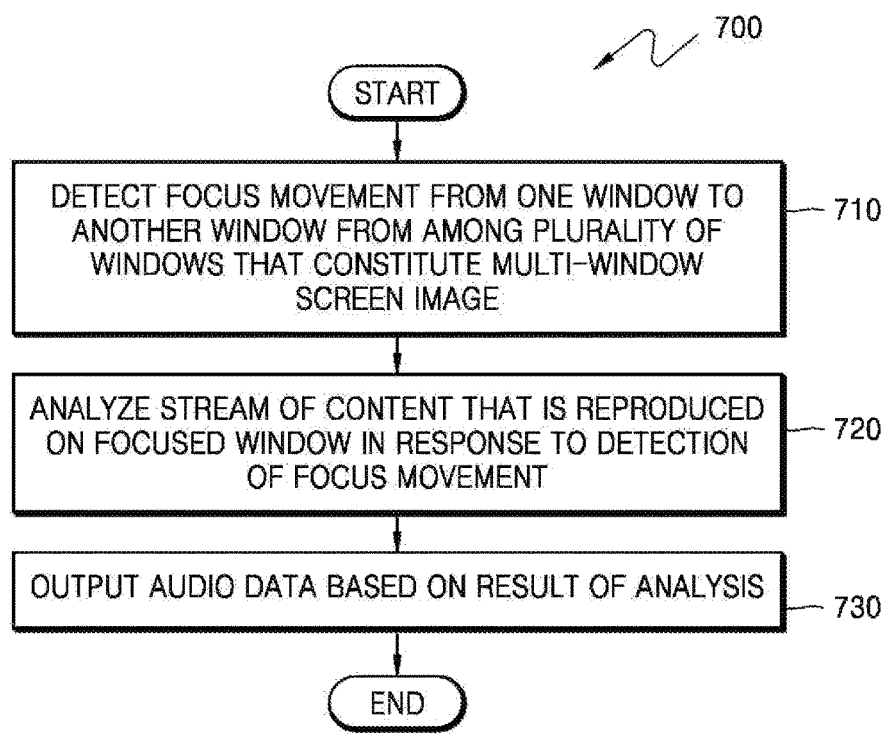
FIG. 7 is a flowchart of a method of operating a display apparatus, according to an exemplary embodiment.

FIG. 7 is a flowchart of a method 700 of operating the display apparatus 100, according to an exemplary embodiment. FIGS. 8A, 8B, 8C, and 8D are views showing the method of FIG. 7.

Referring to FIG. 7, in operation 710, the display apparatus 100 detects a focus movement from one window to another window from among a plurality of windows that constitute a multi-window screen image.

As illustrated in FIG. 8A, the display apparatus 100 provides a multi-window screen image including two windows having the same sizes.

Referring to FIG. 8A, the display apparatus 100 provides a multi-window screen image 800 including two windows, namely, a window 810 and a window 820. For example, content received via the Internet may be output via the window 810, and TV broadcasting program content may be output via the window 820.

The controller 180 of the display apparatus 100 may control content received via the communication interface 150 to be output on the window 810 of the multi-window screen image 800 of the display 115. The controller 180 of the display apparatus 200 may control TV broadcasting program content received via the tuner 140 to be output on the window 820 of the multi-window screen image 800 of the display 115.

The number of windows that are to constitute the multi-window screen image 800 may be provided by the display 115 based on information preset in the storage 190 under the control of the controller 180 or based on user setting information received via the communication interface 150 or the sensor 160 under the control of the controller 180.

Moreover, a source from which content is to be reproduced on each window of the multi-window screen image 800 may be provided by the display 115 based on information pre-stored in the storage 190 under the control of the controller 180 or based on user setting information received via the communication interface 150 or the sensor 160 under the control of the controller 180.

According to an exemplary embodiment, the controller 180 may control the audio output interface 125 to output audio data of content that is output via the window 810 that is being focused.

According to an exemplary embodiment, the controller 180 controls the display 115 to output a predefined icon 840 on an area of the window 810 that is being focused, to represent that audio data of the content that is output via the focused window 810 is being output. The predefined icon 840 is a speaker image in FIG. 8A, but exemplary embodiments are not limited thereto, and the predefined icon 840 may be any image shape.

According to an exemplary embodiment, the controller 180 controls the display 115 to display a colored band 830 on the edge of the window 810 to indicate that the window 810 is focused.

According to an exemplary embodiment, a user who is watching content that is output via the focused window 810 may move a focus from the window 810 to the window 820 by using the control device 200 to select the content that is output via the window 820.

For example, the user may move a focus from the focused window 810 to the window 820 by pressing a right direction key among the four direction keys of the control device 200, by dragging rightward on a touch pad of the control device 200, or by using a pointing device. The controller 180 may detect the focus movement by receiving a window focus movement signal from the control device 200, via the sensor 160.

Referring to FIG. 8B, the controller 180 displays the colored band 830 on the edge of the window 820 to represent that a focus has been moved from the window 810 to the window 820, in response to the detection of the focus movement.

Referring back to FIG. 7, in operation 720, in response to the detection of the focus movement from one window to another window, the display apparatus 100 analyzes a stream of content that is reproduced on the focused window.

When the controller 180 detects the focus movement from one window to another window via the sensor 160, the controller 180 analyzes the stream of the content that is reproduced via the focused window 820. The controller 180 may analyze the stream of the content that is reproduced via the focused window 820, by analyzing, for example, data of a program map table (PMT), as illustrated in FIG. 9.

Figure 9:
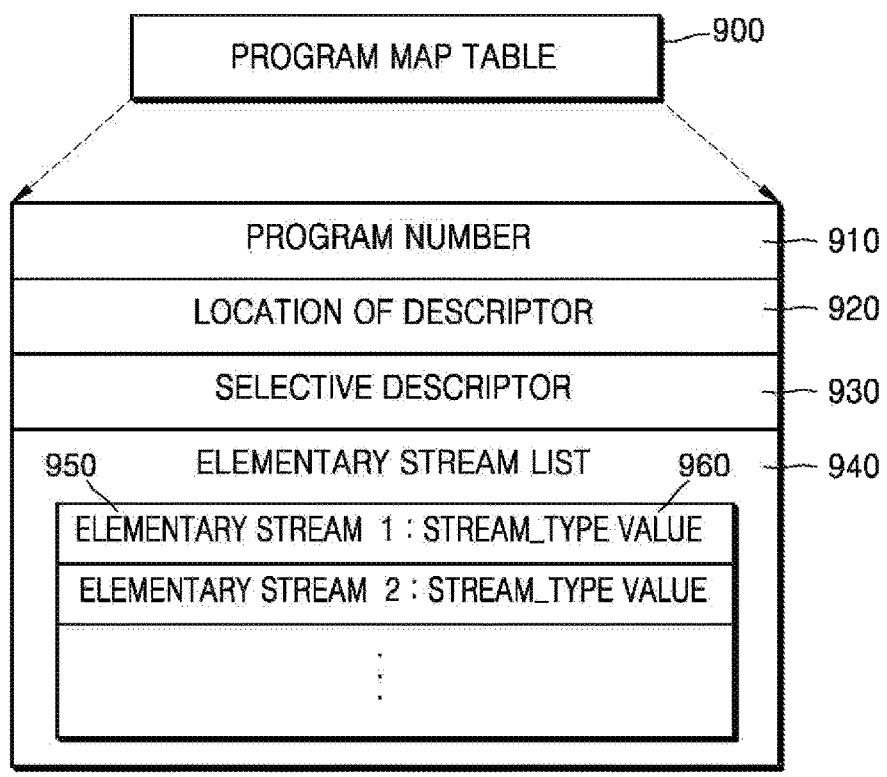
FIG. 9 is a diagram showing a program map table (PMT), according to an exemplary embodiment.

FIG. 9 is a diagram showing a PMT 900, according to an exemplary embodiment.

Referring to FIG. 9, the PMT 900 contains information about programs. One PMT exists for one program. The PMT 900 provides, as information about each program existing in a transport stream, a program number 910, a location 920 of a descriptor that selectively describes the entire MPEG-2 program, a selective descriptor 930 about each elementary stream, and a list 940 of elementary streams including the described MPEG-2 program. Each elementary stream 950 is labeled with a stream_type value 960. The stream_type value 960 represents whether each elementary stream 950 is audio or video. Thus, the controller 180 may determine whether audio data is included in the program, by analyzing the stream_type value 960.

By using information indicating the existence or non-existence of an audio stream, which is included in a PMT as illustrated in FIG. 9, the controller 180 may determine that content corresponding to the PMT includes audio data, when the PMT includes information about an audio stream, and determine that corresponding content does not include audio data, when the PMT includes no information about an audio stream.

Referring back to FIG. 7, in operation 730, the display apparatus 100 outputs audio data based on a result of the analysis of the stream of the content that is reproduced on the focused window.

According to an exemplary embodiment, when audio information is included in the stream of the content that is reproduced on the focused window, the controller 180 may control the audio output interface 125 to output audio data included in the content that is reproduced on the focused window.

According to an exemplary embodiment, as illustrated in FIG. 8B, the controller 180 controls the display 115 to display the predetermined icon 840 on an area of the focused window 820 to represent that the audio data included in the content being reproduced on the focused window 820 is being output.

According to an exemplary embodiment, when no audio information is detected from the stream of the content that is reproduced on the focused window, the controller 180 may control the audio output interface 125 to maintain outputting the audio data that has been used by the window from which focus is moved.

Figure 8D:
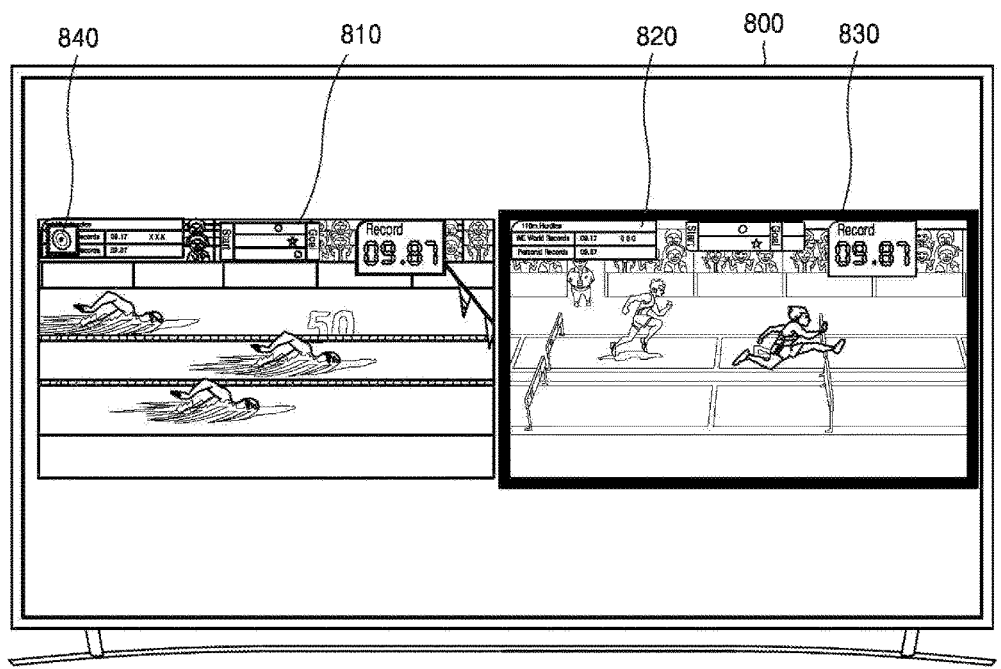

Referring to FIG. 8D, according to an exemplary embodiment, to represent that output of audio data that has been used by the window from which focus is moved is maintained, the controller 180 controls the audio output interface 125 to continuously display the predetermined icon 840 on the window 810, from which focus was moved, although the focus has been moved to the window 820.

For example, when content that is reproduced on a newly focused window is moving picture content, audio data may exist in the content. On the other hand, when a web browsing screen image is being output on the newly focused window or folders included in a USB memory are being output thereon, audio data may not exist. Thus, when audio content exists in content that is reproduced on the newly focused window 820, the audio data is output. When audio content does not exist in content that is reproduced on the newly focused window 820, audio data may not be output because no audio data exists in the content, even if a user wants to output audio data. Accordingly, when no audio data exists in content that is output via the newly focused window 820, the outputting of the audio data of the content that has been output on the previously focused window 810 may be maintained.

Referring to FIG. 8C, according to an exemplary embodiment, when the controller 180 controls the audio output interface 125 to output the audio data included in the content that is reproduced via a focused window, the controller 180 controls the display 115 to output a UI 850 to set the sound of the audio data on the currently focused window.

Referring to FIG. 8C, the UI 850 for sound setting displays an item 851 for representing a UI for sound setting, and a message 852 instructing a user to set sound. The message 852 may be <Please set the sound of the currently focused window.>.

The UI 850 also displays a bar 853 for setting a sound, and a user may set a sound by selecting a location 854 on the bar 853 by using the control device 200 and moving the location 854 to a location corresponding to a desired sound by using a direction key, a drag operation on a touch pad, or a pointing device of the control device 200.

Figure 10:
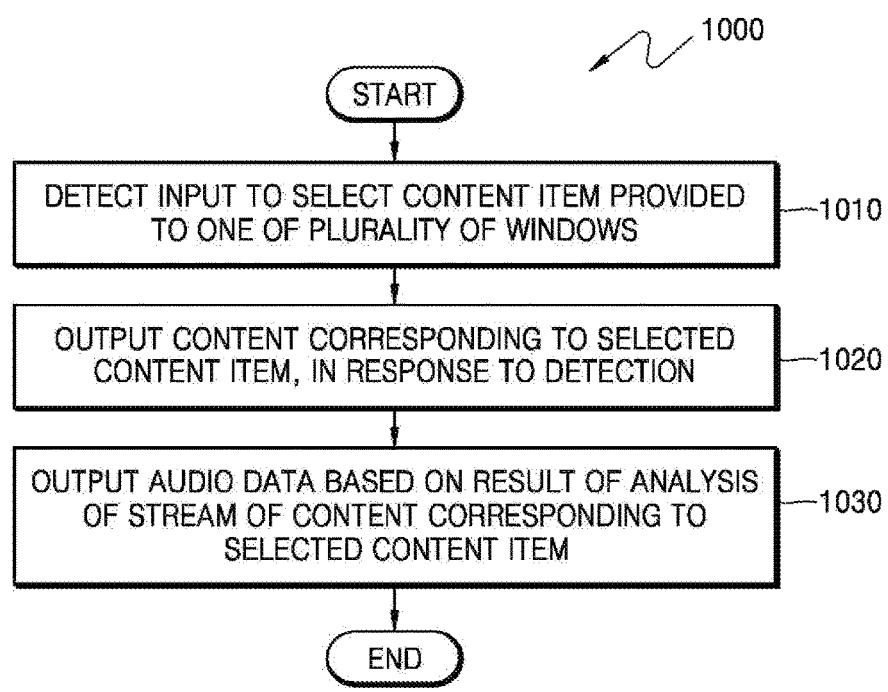
FIG. 10 is a flowchart of a method of operating a display apparatus, according to another exemplary embodiment.

FIG. 10 is a flowchart of a method 1000 of operating the display apparatus 100, according to another exemplary embodiment. FIGS. 11A, 11B, 11C, and 11D are views showing the method of FIG. 10.

Referring to FIG. 10, in operation 1010, the display apparatus 100 detects an input to select a content item provided to one of a plurality of windows that constitute a multi-window screen image.

Provision of the multi-window screen image including the plurality of windows by the display apparatus 100 has already been described above with reference to FIG. 7.

Figure 11A:
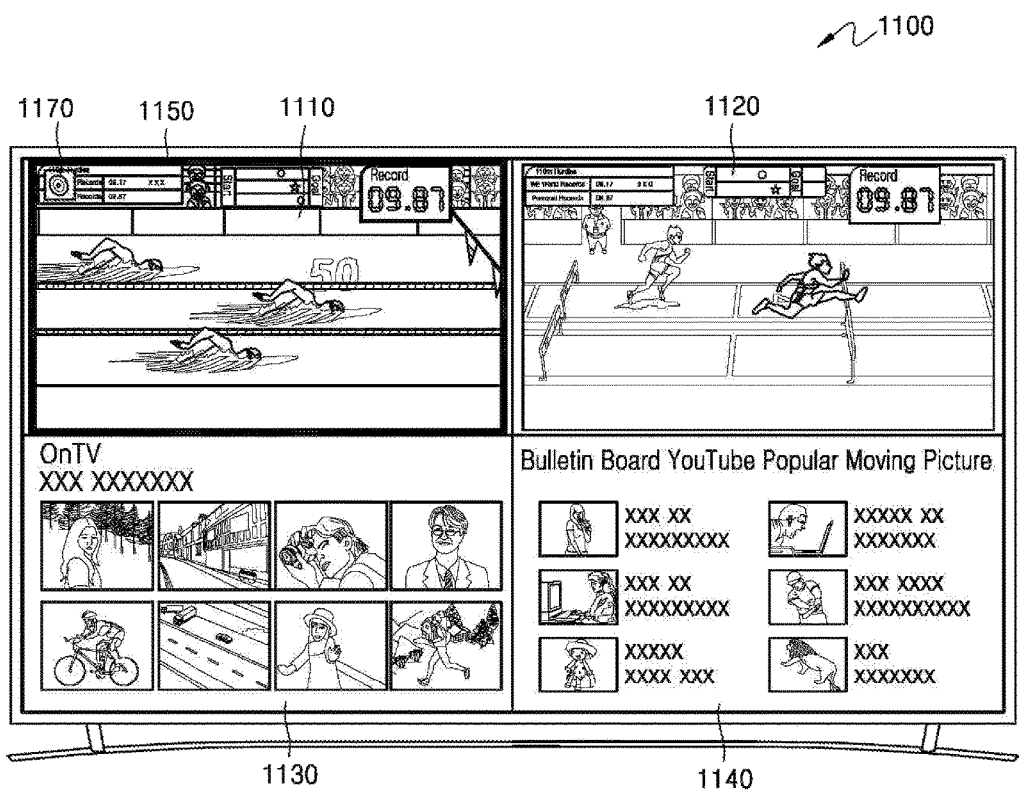
FIGS. 11A, 11B, 11C, and 11D are views showing the method of FIG. 10.

FIG. 11A illustrates an example in which a multi-window screen image 1100 includes 4 windows 1110, 1120, 1130, and 1140.

Referring to FIG. 11A, content received via the Internet is output on the window 1110, a TV broadcasting program is output on the window 1120, broadcasting channel information is output on the window 1130, and a YouTube screen image is output on the window 1140.

A colored band 1150 for representing that the window 1110 is focused is displayed on the edge of the window 1110. To represent that audio data of content being reproduced on the currently focused window 1110 is being output, the controller 180 controls the display 115 to output a speaker-image icon 1170 on a predetermined area on the window 1110.

In this state, for example, a user may move a focus to the window 1140 on which the YouTube screen image is output, and select one of the content items displayed on the window 1140 to which focus has been moved.

Figure 11B:
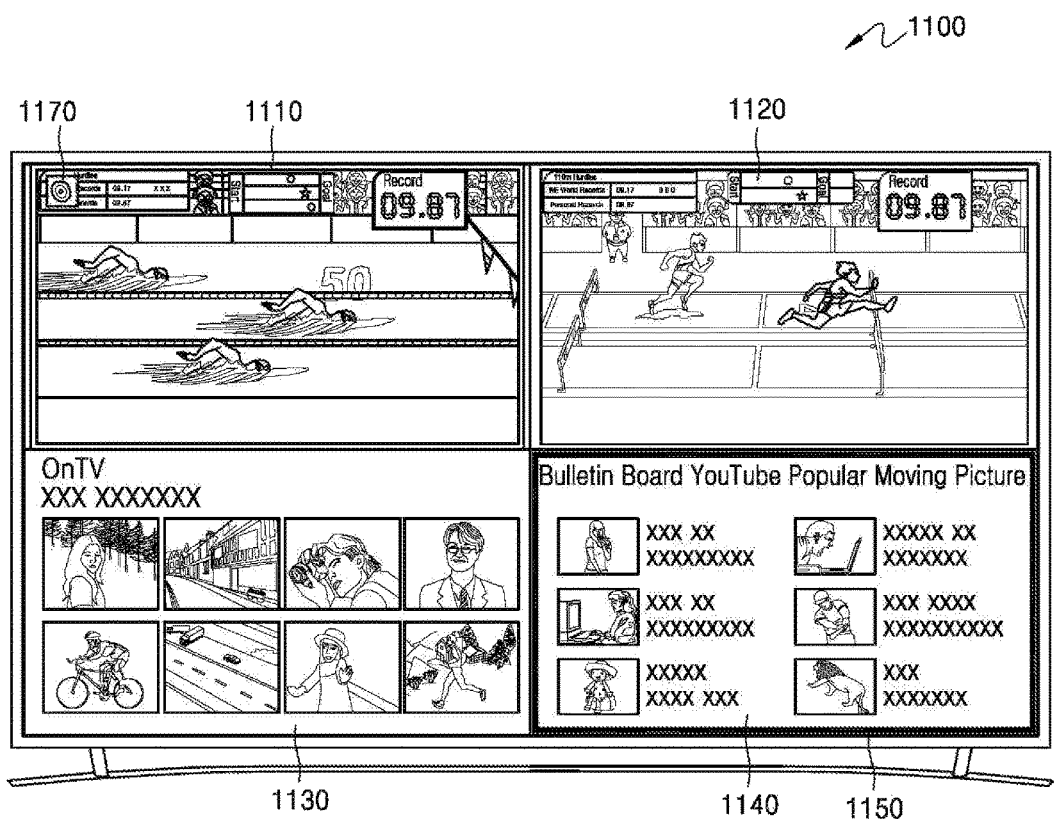

In other words, the user may move the focus to the window 1140 by using the control device 200. FIG. 11B illustrates the colored band 1150 on the window 1140 to represent that the focus has been moved to the window 1140.

Figure 11C:
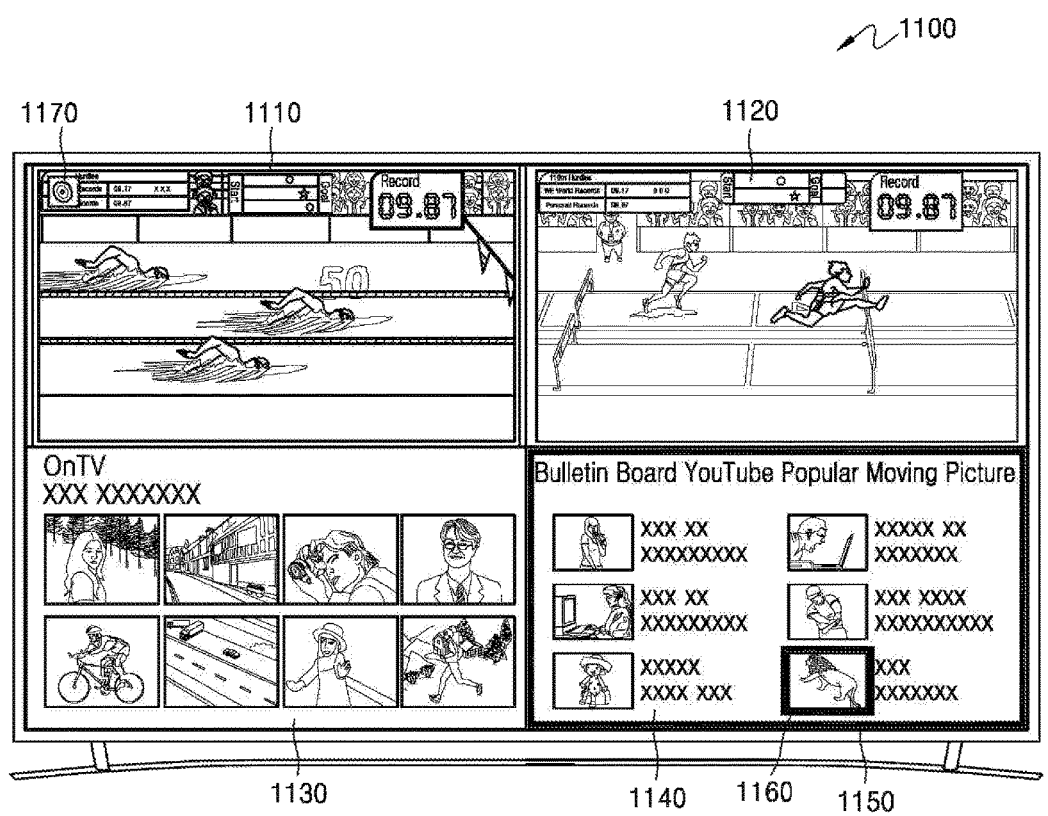

Thereafter, the user may select one of the content items displayed on the currently focused window 1140, by using the control device 200. Referring to FIG. 11C, the user has selected a content item 1160 by using the control device 200, and the controller 180 controls the display 115 to provide a visual effect to the content item 1160 to represent that the content item 1160 has been selected.

When the controller 180 receives a focus movement signal and a content item selection signal generated by the user from the control device 200 via the sensor 160, the controller 180 may detect an input of selecting a content item provided to one of the plurality of windows.

Referring back to FIG. 10, in operation 1020, the display apparatus 100 outputs content corresponding to the selected content item, in response to the detection of the input of selecting the content item.

Figure 11D:
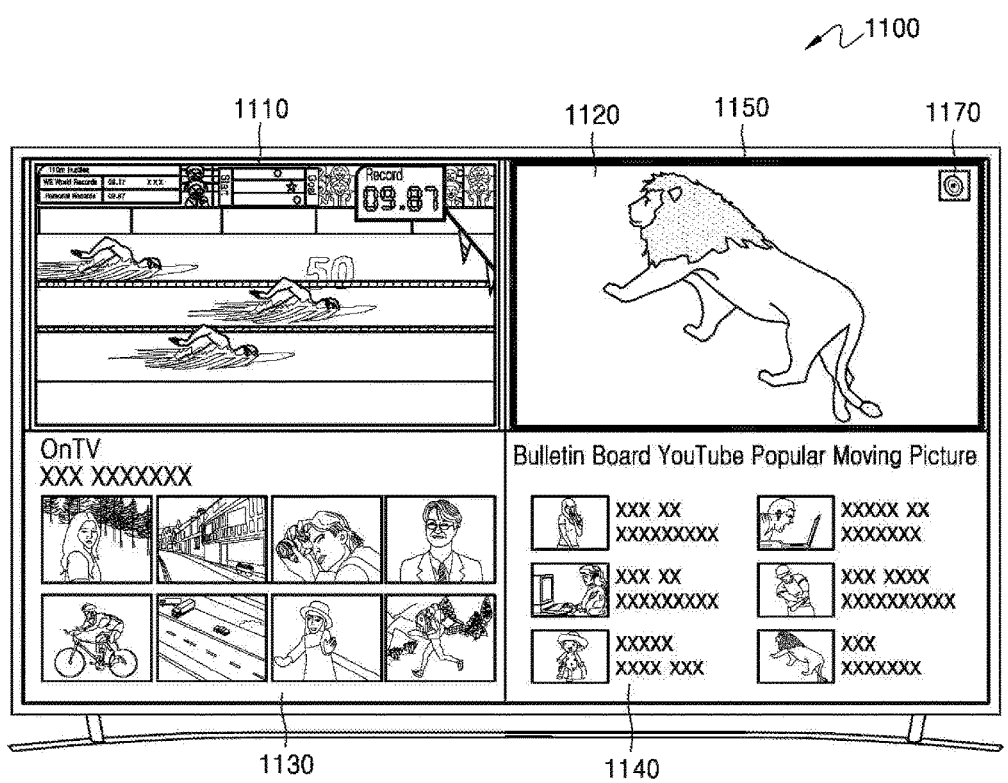

For example, referring to FIG. 11D, the controller 180 may detect a user input to select the content item 1160 on the focused window 1140, and controls the display 115 to output content corresponding to the selected content item 1160 on one of the plurality of windows.

According to an exemplary embodiment, the controller 180 may control the content corresponding to the selected content item 1160 to be output on a window other than the previously focused window 1110.

According to an exemplary embodiment, the controller 180 may control the content corresponding to the selected content item 1160 to be output on the currently focused window 1140.

According to an exemplary embodiment, referring to FIG. 11D, the controller 180 controls the display 115 to output the content corresponding to the selected content item 1160 on the window 1120.

Referring back to FIG. 10, in operation 1030, the display apparatus 100 controls the audio output interface 125 to output audio data based on a result of an analysis of a stream of the content corresponding to the selected content item.

As described above with reference to FIG. 7, when audio information is detected from the stream of selected content based on the analysis of the stream of the selected content, the controller 180 may control the audio output interface 125 to output audio data corresponding to the audio information. Referring to FIG. 11D, to represent that audio data of currently reproduced content is being output, the controller 180 controls the display 115 to output the speaker-image icon 1170 on a predetermined location on the window 1120.

When no audio information is detected from the stream of the selected content based on the analysis of the stream of the selected content, the controller 180 may control the audio output interface 125 to maintain outputting audio data that has been output on the previously focused window 1110.

Figure 12:
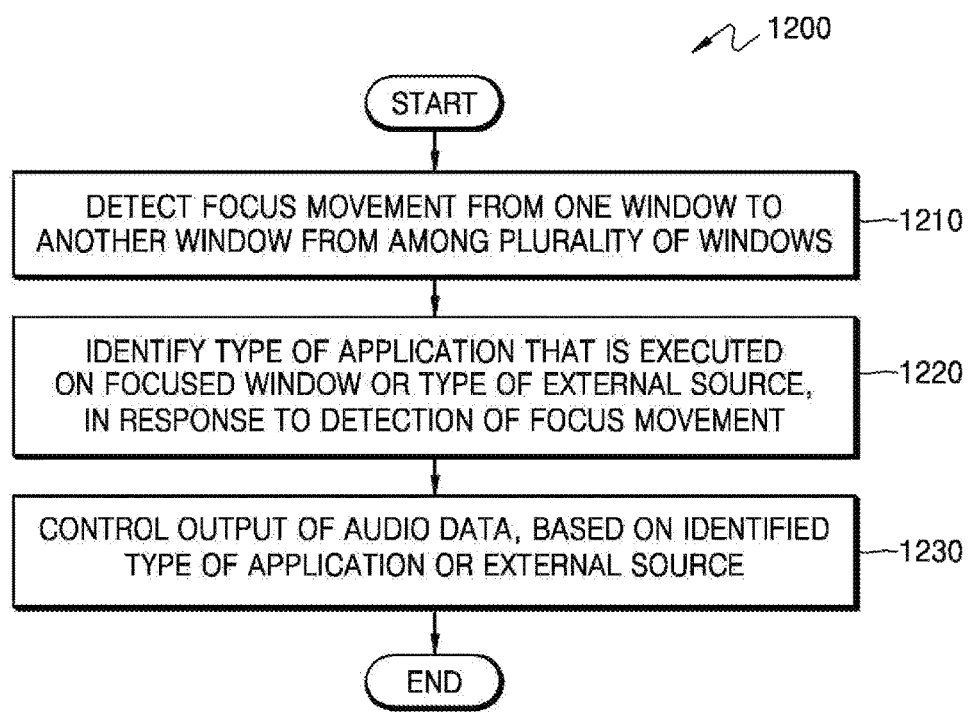
FIG. 12 is a flowchart of a method of operating a display apparatus, according to another exemplary embodiment.

FIG. 12 is a flowchart of a method 1200 of operating the display apparatus 100, according to another exemplary embodiment. FIGS. 13A, 13B, 13C, 13D, and 13E are views showing the method of FIG. 12.

Referring to FIG. 12, in operation 1210, the display apparatus 100 detects a focus movement from one window to another window among a plurality of windows that constitute a multi-window screen image.

Figure 13A:
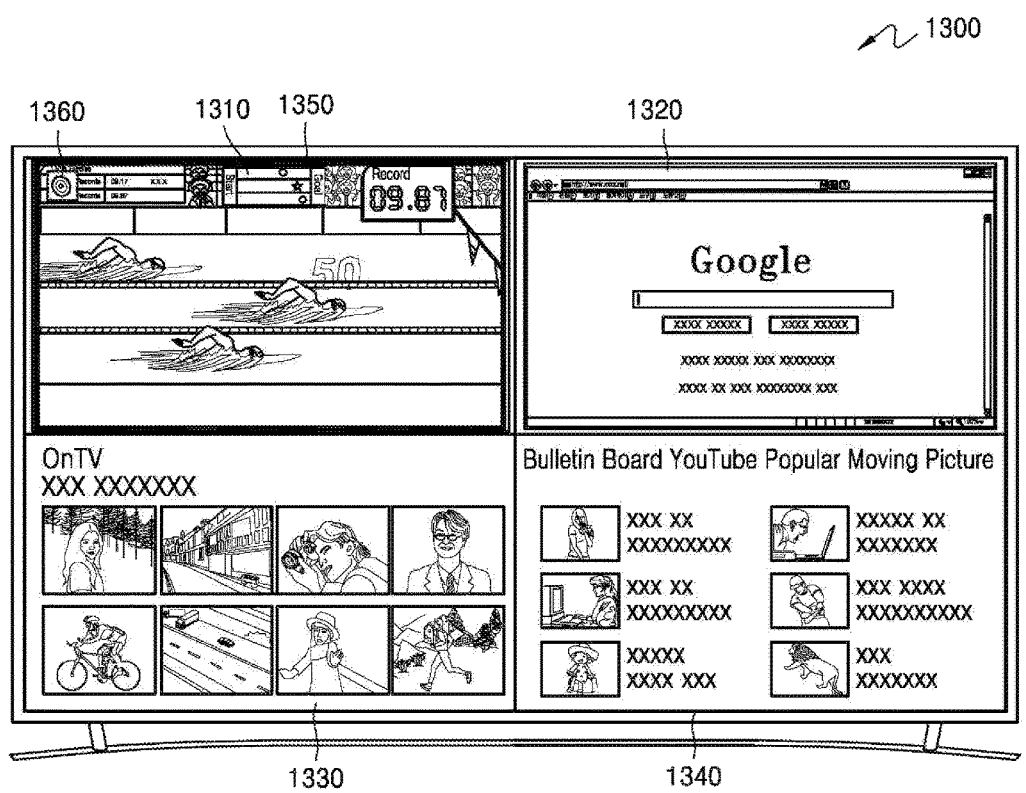
FIGS. 13A, 13B, 13C, 13D, and 13E are views showing the method of FIG. 12.

FIG. 13A illustrates an example in which a multi-window screen image 1300 includes 4 windows 1310, 1320, 1330, and 1340.

Referring to FIG. 13A, content received via the Internet is output on the window 1310, a web browsing screen image is output on the window 1320, broadcasting channel information is output on the window 1330, and a YouTube screen image is output on the window 1340.

A colored band 1350 for representing that the window 1310 is focused is displayed on the edge of the window 1310. To represent that audio data of content being reproduced on the currently focused window 1310 is being output, a speaker-image icon 1360 is displayed on a predetermined area on the window 1310.

Figure 13B:
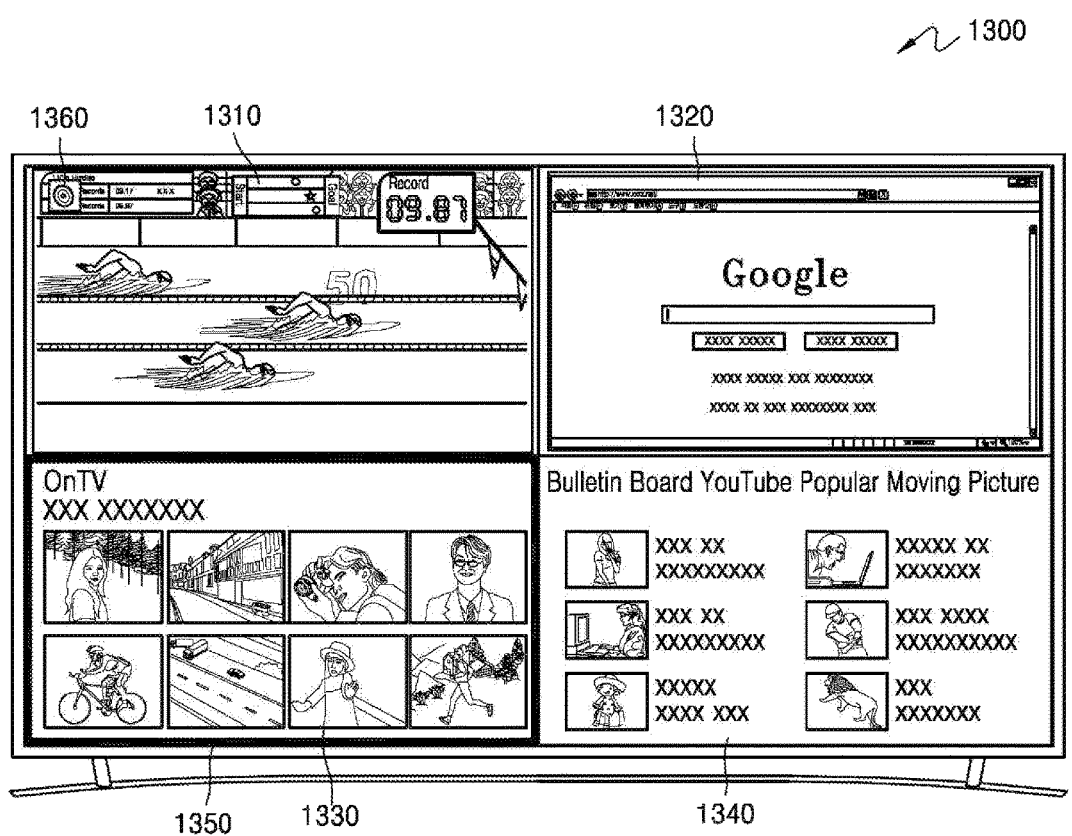

In the detection of the focus movement on the multi-window screen image, as described above with reference to FIG. 7, the controller 180 may detect a focus movement signal from the control device 200 via the sensor 160. Referring to FIG. 13B, a user moves a focus from the window 1310 to the window 1330, and the colored band 1350 is output according to detection of the focus movement to represent that the window 1330 is currently focused.

Referring back to FIG. 12, in operation 1220, the display apparatus 100 identifies a type of application that is executed on the focused window or a type of external source, in response to the detection of the focus movement.

In operation 1230, the display apparatus 100 controls output of audio data, based on the identified type of application or external source.

When the focus movement is detected according to a signal from the sensor 160, the controller 180 may identify the type of application that is executed on the focused window or the type of external source, in response to the detection of the focus movement.

According to an exemplary embodiment, referring to FIG. 13B, the focused window 1330 executes an application of displaying broadcasting channel information. Audio information is not detected from the application of displaying broadcasting channel information. Thus, the controller 180 may control the audio data of the content of the previously focused window 1310 to be continuously output. To indicate that audio data of the content being reproduced on the previously focused window 1310 is output, the speaker-image icon 1360 is displayed on a predetermined area on the window 1310.

Figure 13C:
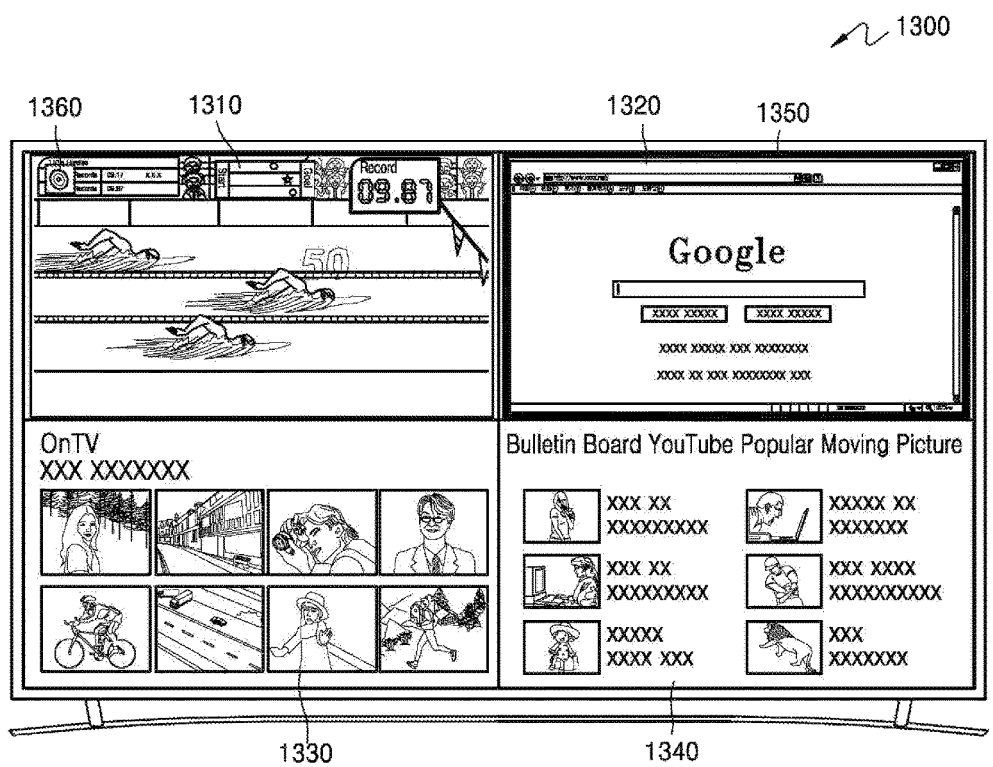

According to an exemplary embodiment, referring to FIG. 13C, the window 1320 is focused, and the focused window 1320 is executing a web browsing application. Audio information is not detected from the web browsing application. Thus, the controller 180 may control the audio data of the content of the previously focused window 1310 to be continuously output. To indicate that audio data of the content being reproduced on the previously focused window 1310 is output, the speaker-image icon 1360 is continuously displayed on the predetermined area on the window 1310.

Figure 13D:
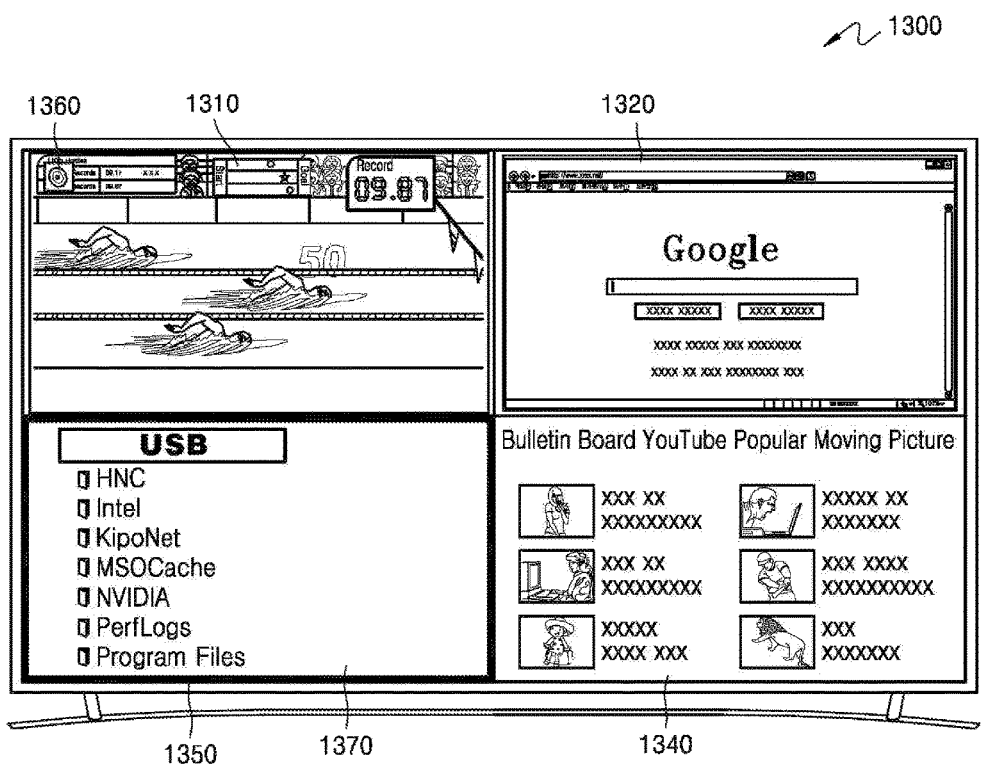

According to an exemplary embodiment, referring to FIG. 13D, a window 1370 is focused, and the focused window 1370 displays a USB data space, which is an external source. Audio information is not detected from an application of displaying the data space of an external source. Thus, the controller 180 may control the audio data of the content of the previously focused window 1310 to be continuously output. To represent that audio data of the content being reproduced on the previously focused window 1310 is output, the speaker-image icon 1360 is continuously displayed on the predetermined area on the window 1310.

Figure 13E:
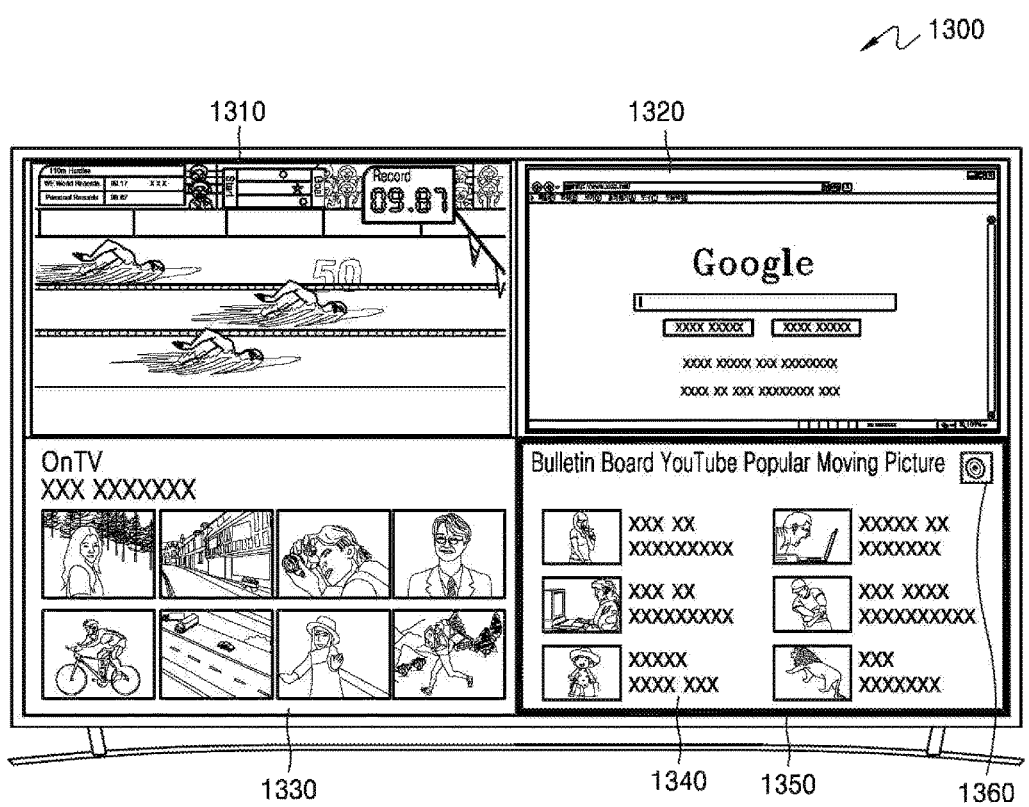

According to an exemplary embodiment, referring to FIG. 13E, the window 1340 is focused, and the focused window 1340 displays a YouTube screen image. Selectable content items are illustrated on the YouTube screen image. A content item is selected on such YouTube screen image and content corresponding to the selected content item is then reproduced. However, such a YouTube screen image may output predetermined audio data as a default even before a content item is selected. Thus, the controller 180 may control the audio output interface 125 to output default audio data of an application that is executed on the focused window 1340. In this case, to represent that audio data of the content being reproduced on the focused window 1340 is output, the speaker-image icon 1360 is displayed on a predetermined area on the window 1340.

Figure 14:
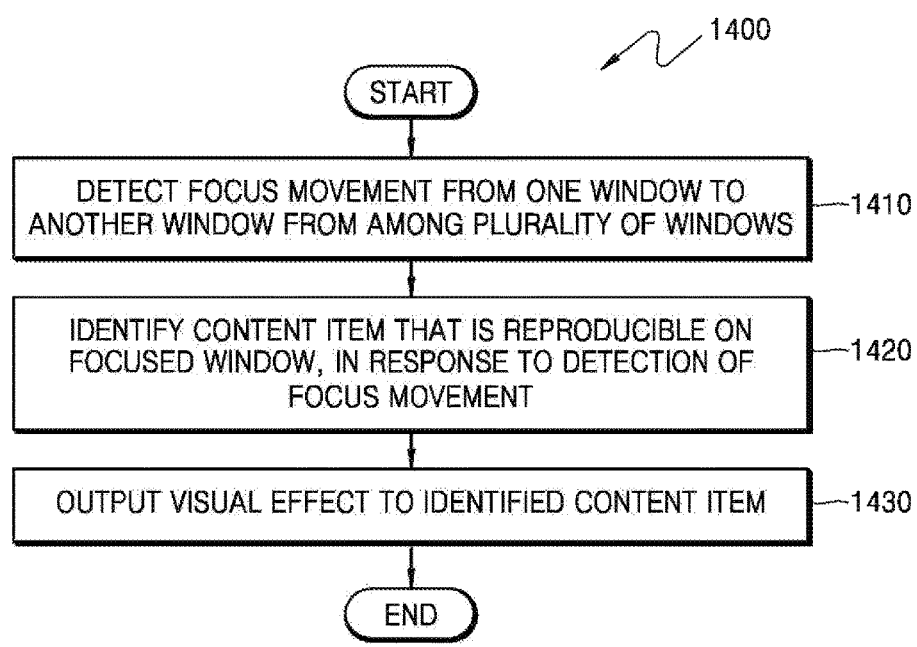
FIG. 14 is a flowchart of a method of operating a display apparatus, according to another exemplary embodiment.
Figure 15:
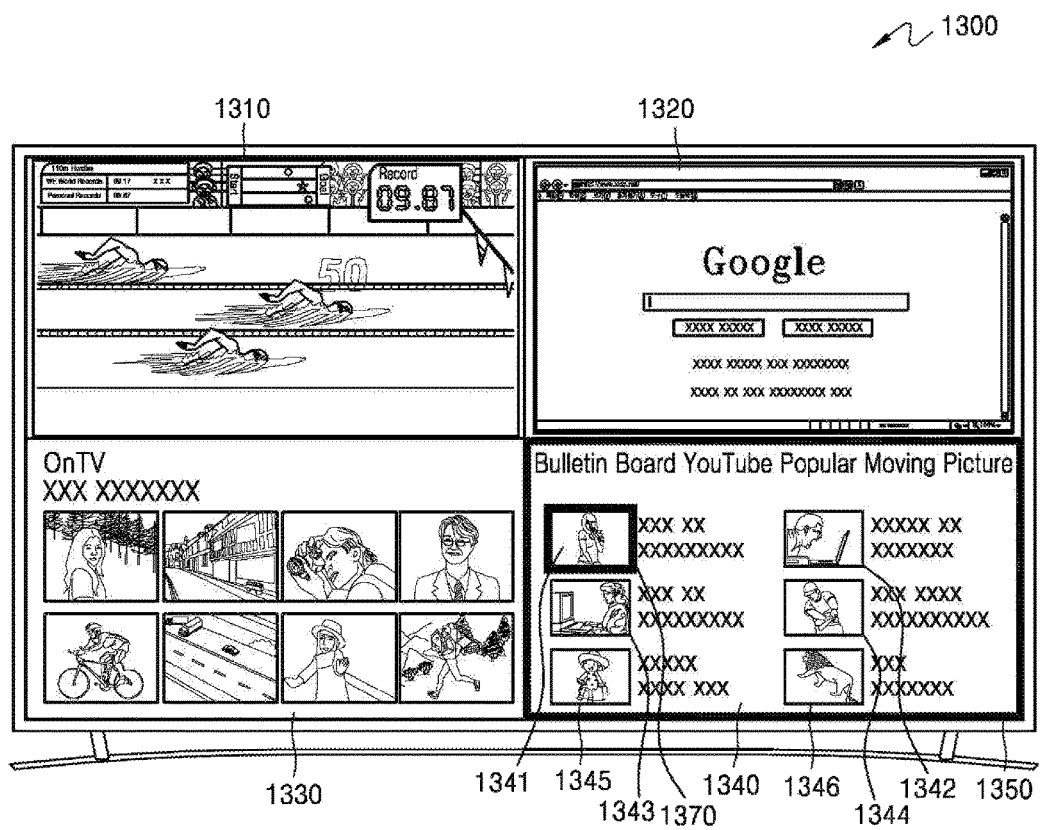
FIG. 15 is a view showing the method of FIG. 14.

FIG. 14 is a flowchart of a method 1400 of operating the display apparatus 100, according to another exemplary embodiment. FIG. 15 is a view showing the method of FIG. 14.

Referring to FIG. 14, in operation 1410, the display apparatus 100 detects a focus movement from one window to another window among a plurality of windows that constitute a multi-window screen image.

In operation 1420, the display apparatus 100 identifies a content item that is reproducible on the focused window, in response to the detection of the focus movement.

In operation 1430, the display apparatus 100 controls the display 115 to output a visual effect to the identified content item.

For example, referring to FIG. 15, when the controller 180 detects a focus movement from the window 1310 to the window 1340, the controller 180 may identify a reproducible content item among the content items output by the focused window 1340 in response to the detection. For example, when a plurality of content items 1341, 1342, 1343, 1344, 1345, and 1346 are displayed on the focused window 1340, the controller 180 may distinguish reproducible content items from content items that are non-reproducible but are only displayed, among the content items 1341, 1342, 1343, 1344, 1345, and 1346, by using, for example, meta information of data that is output by the focused window 1340. When the controller 180 identifies the reproducible content item 1341 among the plurality of content items 1341, 1342, 1343, 1344, 1345, and 1346, the controller 180 controls the display 115 to produce a visual effect 1370, representing that the identified reproducible content item 1341 has been selected, on the content item 1341. By displaying the selected reproducible content item 1341 with the visual effect 1370, a user may skip a process of again searching for the reproducible content item from the focused window by using the control device 200, and may reproduce content corresponding to the selected reproducible content item 1341 by a manipulation of simply selecting the selected reproducible content item 1341 by using the control device 200.

According to an exemplary embodiment, when a user uses a multi-window screen image including a plurality of windows and wants to move a focus from one window to another window or select and reproduce a content item provided to a window, sound output is naturally provided, for the convenience of the user.

In addition, the exemplary embodiments may also be implemented through computer-readable code and/or instructions on a medium, e.g., a computer-readable medium, to control at least one processing element to implement exemplary embodiments. The medium may correspond to any medium or media which may serve as a storage and/or perform transmission of the computer-readable code an exemplary embodiment The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display;
an audio output interface; and
a controller configured to:
control the display to display a multi-window screen image comprising a plurality of windows, each window of the plurality of windows displaying a corresponding content;
control the display to display a focus on a first window among the plurality of windows, the focus being a visual effect indicating that a corresponding window is selected among the plurality of windows;
in response to a user input for moving the focus from the first window to a second window displayed on the display, control the display to remove the visual effect on the first window and to apply the visual effect on the second window, and determine whether a content that is reproduced in the focused second window comprises an audio stream based on a stream type value of the content included in a program map table, the stream type value indicating whether or not the content is video or audio;
in response to the content being determined to comprise the audio stream, control the audio output interface to output the audio stream of the content reproduced in the focused second window, and control the display to display, on the focused second window, a predefined icon indicating that the audio stream corresponding to the focused second window is output; and
in response to the content being determined to not comprise the audio stream, control the audio output interface to maintain outputting audio data of the first window, and control the display to display, on the first window, the predefined icon indicating that the audio stream corresponding to the first window is output.

2. The display apparatus of claim 1, wherein the second window comprises a plurality of content items, and
the controller is further configured to control the display to display a visual effect on a content item among the plurality of content items included the second window in response to a user input selecting the content item.

3. The display apparatus of claim 2, wherein the controller is further configured to:
control the display to reproduce the content item selected on a third window from the plurality of windows, and determine whether the content item selected being reproduced in the third window comprises an audio stream; and
in response to the content item reproduced in the third window being determined to comprise the audio stream, control the audio output interface to output the audio stream of the content item selected being reproduced in the third window, and control the display to display, on the third window, the predefined icon indicating that the audio stream corresponding to the third window is output.

4. A display method comprising:
displaying a multi-window screen image comprising a plurality of windows, each window of the plurality of windows displaying a corresponding content;
displaying a focus on a first window among the plurality of windows, the focus being a visual effect indicating that a corresponding window is selected among the plurality of windows;

in response to a user input for moving the focus from the first window to a second window displayed on the display, control the display to remove the visual effect on the first window and to apply the visual effect on the second window, and determine whether a content that is reproduced in the focused second window comprises an audio stream based on a stream type value of the content included in a program map table, the stream type value indicating whether or not the content is video or audio;

in response to the content being determined to comprise the audio stream, outputting the audio stream of the content reproduced in the focused second window, and displaying, on the focused second window, a predefined icon indicating that the audio stream corresponding to the focused second window is output;

in response to the content being determined to not comprise the audio stream, maintaining outputting audio data of the first window, and displaying, on the first window, the predefined icon indicating that the audio stream corresponding to the first window is output.

5. The display method of claim 4, further comprising:

displaying a plurality of content items in the second window; and displaying a visual effect on a content item among the plurality of content items included the second window in response to a user input selecting the content item.

6. The display method of claim 5, further comprising:

displaying the content item selected on a third window from the plurality of windows, and determining whether the content item selected being reproduced in the third window comprises an audio stream; and in response to the content item reproduced in the third window being determined to comprise the audio stream, outputting the audio stream of the content item being reproduced in the third window, and displaying, on the third window, the predefined icon indicating that the audio stream corresponding to the third window is output.

* * * * *